(12) United States Patent
Jung

(10) Patent No.: US 11,782,485 B2
(45) Date of Patent: Oct. 10, 2023

(54) ELECTRONIC DEVICE INCLUDING AIR VENT HOLE

(71) Applicant: SAMSUNG ELECTRONICS CO., LTD., Suwon-si (KR)

(72) Inventor: Minsu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/827,033

(22) Filed: May 27, 2022

(65) Prior Publication Data

US 2023/0059598 A1  Feb. 23, 2023

Related U.S. Application Data

(63) Continuation of application No. PCT/KR2022/005310, filed on Apr. 12, 2022.

(30) Foreign Application Priority Data

Aug. 23, 2021 (KR) .................. 10-2021-0111022

(51) Int. Cl.
 *G06F 1/16* (2006.01)
(52) U.S. Cl.
 CPC .... *G06F 1/1658* (2013.01); *G06F 2200/1633* (2013.01)
(58) Field of Classification Search
 CPC ................. G06F 1/1656; G06F 1/1658; G06F 2200/1633
 See application file for complete search history.

(56) References Cited

U.S. PATENT DOCUMENTS

| 5,811,728 A * | 9/1998 | Maeda | H02G 3/088 |
| | | | 174/152 G |
| 5,912,433 A * | 6/1999 | Pulido | H02G 15/113 |
| | | | 174/92 |

(Continued)

FOREIGN PATENT DOCUMENTS

| KR | 10-0939540 B1 | 2/2010 |
| KR | 10-2017-0100368 A | 9/2017 |

(Continued)

OTHER PUBLICATIONS

Search Report (PCT/ISA/210) dated Jul. 21, 2022 by the International Searching Authority in International Application No. PCT/KR2022/005310.

(Continued)

*Primary Examiner* — Adrian S Wilson
(74) *Attorney, Agent, or Firm* — Sughrue Mion, PLLC

(57) ABSTRACT

According to various embodiments of the present disclosure, an electronic device may include: a housing including a first support member, and a side structure surrounding at least a portion of an area in which the first support member is provided; a first opening extending from an outer surface of the side structure to an internal space of the housing through at least a portion of the side structure; a second opening provided at one side of the first opening and extending from the outer surface of the side structure to the internal space of the housing through at least a portion of the side structure; a vent hole extending from an inner wall of the second opening and having one end exposed to one surface of the first support member; and a waterproof member at least partially accommodated in the second opening. Various other embodiments are possible.

20 Claims, 15 Drawing Sheets

(56) References Cited

U.S. PATENT DOCUMENTS

| | | | | |
|---|---|---|---|---|
| 6,010,134 | A * | 1/2000 | Katoh | B60R 16/0222 |
| | | | | 174/152 G |
| 6,134,335 | A * | 10/2000 | Yang | H04R 5/02 |
| | | | | 361/679.61 |
| 6,353,185 | B1 * | 3/2002 | Sakata | H02G 3/18 |
| | | | | 174/152 G |
| 7,558,396 | B2 * | 7/2009 | Liu | H04R 9/08 |
| | | | | 381/357 |
| 9,510,097 | B1 * | 11/2016 | Tsai | H04R 1/086 |
| 2006/0098966 | A1 | 5/2006 | Takahashi et al. | |
| 2013/0063004 | A1 | 3/2013 | Lai et al. | |
| 2014/0064546 | A1 * | 3/2014 | Szczech | H04R 19/04 |
| | | | | 381/361 |
| 2015/0163572 | A1 | 6/2015 | Weiss et al. | |
| 2015/0295617 | A1 | 10/2015 | Lai et al. | |
| 2017/0251564 | A1 | 8/2017 | Jun et al. | |
| 2019/0098121 | A1 | 3/2019 | Jeon et al. | |
| 2019/0120805 | A1 | 4/2019 | Kwak et al. | |
| 2019/0189147 | A1 * | 6/2019 | Monteith | H01H 23/02 |
| 2021/0042478 | A1 | 2/2021 | Heo et al. | |
| 2021/0243907 | A1 | 8/2021 | Jung et al. | |
| 2021/0289650 | A1 * | 9/2021 | Mueller | H05K 5/062 |
| 2023/0019623 | A1 * | 1/2023 | Fukutsuka | A61B 7/003 |

FOREIGN PATENT DOCUMENTS

| | | |
|---|---|---|
| KR | 10-2019-0034063 A | 4/2019 |
| KR | 10-1964976 B1 | 4/2019 |
| KR | 10-2019-0057286 A | 5/2019 |
| KR | 10-2021-0097335 A | 8/2021 |

OTHER PUBLICATIONS

Written Opinion (PCT/ISA/237) dated Jul. 21, 2022 by the International Searching Authority in International Application No. PCT/KR2022/005310.

* cited by examiner

ELECTRONIC DEVICE INCLUDING AIR VENT HOLE

CROSS-REFERENCE TO RELATED APPLICATION(S)

This application is a Bypass Continuation Applications of International Application No. PCT/KR2022/005310, which was filed on Apr. 12, 2022, and is based on and claims priority under 35 U.S.C. § 119 to Korean Patent Application No. 10-2021-0111022, which was filed in the Korean Intellectual Property Office on Aug. 23, 2021, the entire disclosure of each of which is incorporated herein by reference.

BACKGROUND

1. Technical Field

Various embodiments of the disclosure relate to an electronic device. For example, various embodiments of the disclosure relate to an electronic device including an air vent hole.

2. Background Art

Typically, an electronic device may mean a device that performs a specific function according to a program provided therein (e.g., an electronic scheduler, a portable multimedia reproducer, a mobile communication terminal, a tablet personal computer (PC), an image/sound device, a desktop/laptop PC, or a vehicle navigation system), as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function such as gameplay, a multimedia function such as music/video playback, a communication and security function for mobile banking or the like, and/or a schedule management or e-wallet function, are integrated in a single electronic device, in addition to a communication function.

As the use of electronic devices such as mobile communication terminals and smart phones becomes commonplace, electronic devices may be exposed to various use environments. An electronic device may be exposed to a sudden temperature change due to a user's movement in an environment with a large indoor/outdoor temperature difference, and exposure to a high humidity environment or moisture may cause a malfunction or failure of the electronic device. As one of the methods of suppressing the influence of the use environment, the electronic device may be equipped with a waterproof structure. For example, the electronic device may be provided with a waterproof structure to prevent moisture from contaminating the inside of the electronic device.

The above-described information is background for the purpose of helping understanding of non-limiting example embodiments the disclosure of this document. No claim or determination is made as to whether any of the foregoing may be applied as prior art regarding the disclosure of this document.

SUMMARY

As the performance of a waterproof structure is increased, the internal space of the electronic device may be hermetically sealed or closed from the external space to be free from contamination by moisture. For example, the user may freely use the electronic device outdoors even in the rain, and may enjoy water leisure activities such as swimming or surfing while carrying the electronic device. However, in a structure in which the internal space of the electronic device is hermetically sealed or closed, the operation of a sound component based on a voice coil may not be smooth. When the internal pressure of the electronic device is increased due to an external force or an increase in internal temperature in a sealed or sealed structure of the internal space of the electronic device, a sound component may be damaged.

Various embodiments disclosed herein may solve at least the above-described problems and/or disadvantages and provide at least the advantages to be described below, and are able to provide an electronic device that creates a stable operating environment of a sound component.

Various embodiments disclosed herein may provide an electronic device having a beautiful appearance while creating a stable operating environment for a sound component.

Various embodiments disclosed herein may provide an electronic device having excellent waterproof performance while creating a stable operating environment of a sound component.

Problems solved by embodiments of the disclosure are not limited to the above-mentioned problems, and additional aspects according to various embodiments will be presented through the detailed description to be described later, and may be clear from the description or understood through the presented non-limiting example embodiments.

According to various embodiments of the present disclosure, an electronic device may include: a housing including a first support member disposed between a front surface and a rear surface of the electronic device, and a side structure disposed to surround at least a portion of an area in which the first support member is disposed; a first opening extending from an outer surface of the side structure to an internal space of the housing through at least a portion of the side structure; a second opening disposed at one side of the first opening and extending from the outer surface of the side structure to the internal space of the housing through at least a portion of the side structure; a vent hole extending from an inner wall of the second opening and having one end exposed to one surface of the first support member; and a waterproof member at least partially accommodated in the second opening. The waterproof member may include a pin member configured to be linearly reciprocated within the second opening, and at least one waterproof ring protruding from an outer peripheral surface of the pin member and configured to seal a space between the outer peripheral surface of the pin member and the inner wall of the second opening. The other end of the vent hole may be exposed to an inside of the second opening between the at least one waterproof ring and the outer surface of the side structure.

According to various embodiments disclosed herein, the electronic device may include: a housing including a first opening extending in one direction and a second opening provided in parallel with the first opening at one side of the first opening; an air vent hole that connects an internal space of the housing to an external space; and a waterproof member at least partially accommodated in the second opening. The waterproof member may include a pin member configured to linearly reciprocate within the second opening, and at least one waterproof ring protruding from an outer peripheral surface of the pin member and configured to seal a space between the outer peripheral surface of the pin member and the inner wall of the second opening. The air vent hole may include at least a portion of the second opening between the at least one waterproof ring and the outer surface of the housing.

According to various embodiments disclosed herein, an electronic device may include an air vent hole that interconnects the internal space and the external space, thereby providing a stable operating environment of a sound component. According to an embodiment, in an electronic device, a portion of the opening(s) for a structure (e.g., a storage medium tray) that is detachably provided in the housing may be utilized as an air vent hole and may not be substantially exposed in the external appearance. For example, since an opening already formed in the electronic device or the housing is utilized as an air vent hole, it is possible to prevent deterioration of the external appearance of the electronic device due to the air vent hole while providing a stable operating environment of a sound component. In another embodiment, an air vent hole may be concealed with an air-permeable waterproof film in the inside of the electronic device and configured to release the internal pressure to the outside while implementing a waterproof structure. In addition, various effects recognized directly or indirectly through this document may be provided.

Other aspect(s), advantage(s), and principal configuration(s) of the disclosure will become apparent to those skilled in the art upon reading the following detailed description of various embodiments with reference to the accompanying drawings.

BRIEF DESCRIPTION OF DRAWINGS

The above and other aspects, features, and advantages of certain embodiments of the present disclosure will be more apparent from the following description taken in conjunction with the accompanying drawings, in which.

Throughout the appended drawings, like reference numerals may be assigned to like parts, components, and/or structures.

DETAILED DESCRIPTION

The following description made with reference to the appended drawings may be provided in order to help comprehensive understanding of the various implementations of the disclosure. A specific embodiment disclosed in the following description includes various specific details to help understanding, but is considered to be one of various non-limiting embodiments. Accordingly, it will be apparent to those skilled in the art that various changes and modifications of the various implementations described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments disclosed herein. Therefore, it will be understood to those skilled in the art that the following description of various implementations of the disclosure is provided only for the purpose of explanation, not for the purpose of limiting the disclosure defined as the scope of rights and equivalents thereto.

It should be understood that the singular forms of "a", "an", and "the" contain plural meanings, unless the context clearly indicates otherwise. Thus, for example, "a component surface" may mean including one or more component surfaces.

Figure 1:
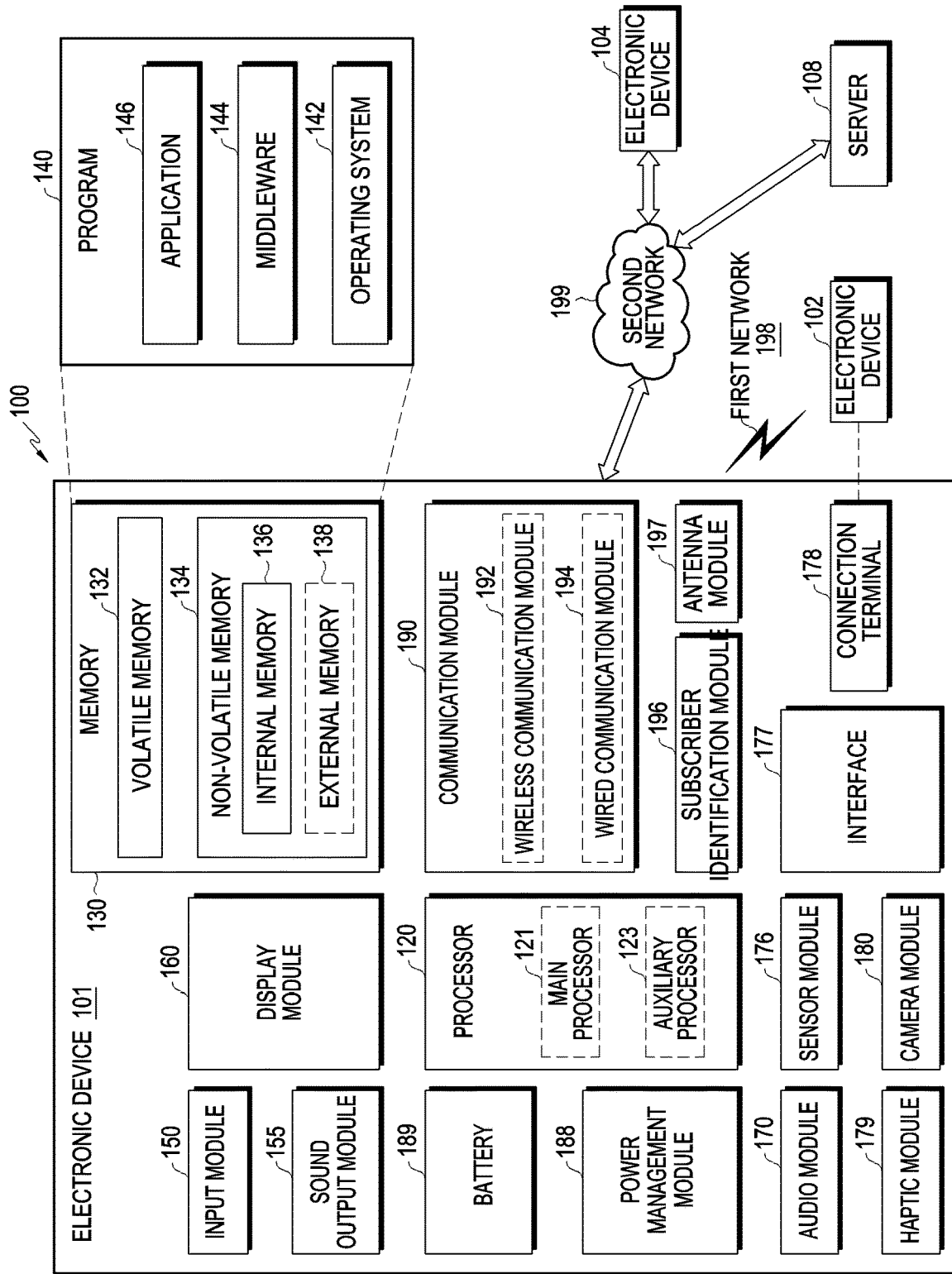
FIG. 1 is a block diagram illustrating an electronic device according to various embodiments disclosed herein within a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in nonvolatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the nonvolatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a longitudinal direction, a width direction, and/or a thickness direction of an electronic device may be referred to, wherein the longitudinal direction may be defined as the "Y-axis direction", the width direction may be defined as the "X-axis direction", and/or the thickness direction may be defined as the "Z-axis direction". In some embodiments, "negative/positive (−/+)" may be referred to together with the Cartesian coordinate system illustrated in the drawings regarding the direction in which a component is oriented. For example, the front surface of an electronic device or a housing may be defined as a "surface oriented in the +Z direction", and the rear surface may be defined as a "surface oriented in the −Z direction". In some embodiments, a side surface of an electronic device or a housing may include an area oriented in the +X direction, an area oriented in the +Y direction, an area oriented in the −X direction, and/or an area oriented in the −Y direction. In another embodiment, the "X-axis direction" may include both the "−X direction" and the "+X direction". It is noted that these are based on the Cartesian coordinate system described in the drawings for the sake of brevity of description, and the description of these directions or components does not limit the various embodiments disclosed herein.

Figure 2:
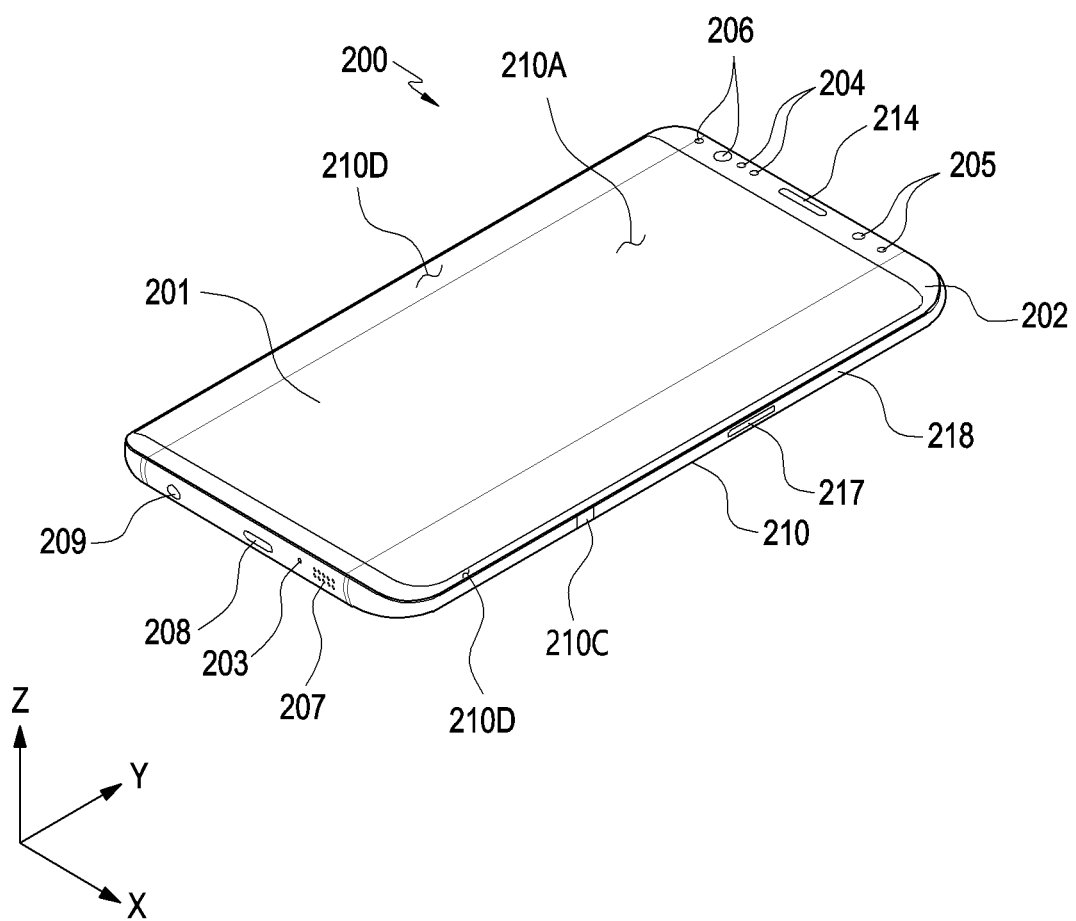
FIG. 2 is a perspective view illustrating the front surface of the electronic device according to various embodiments disclosed herein.
Figure 3:
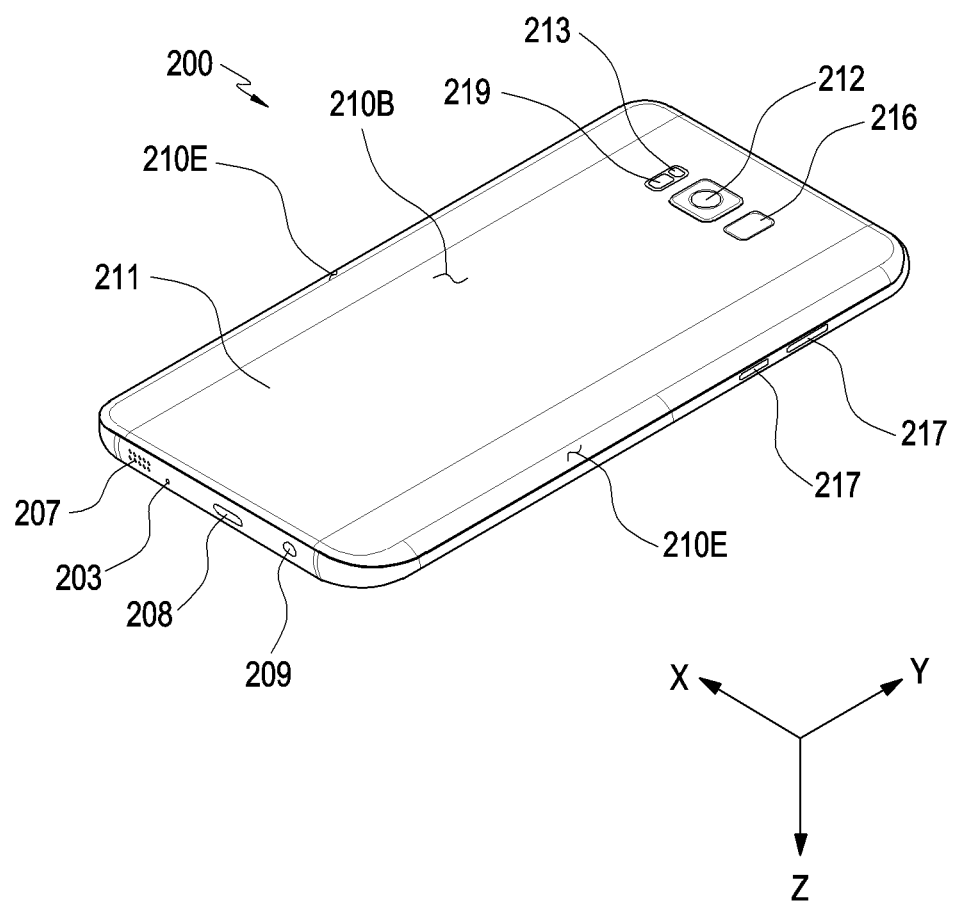
FIG. 3 is a perspective view illustrating the rear surface of the electronic device illustrated in FIG. 2.

FIG. 2 is a perspective view illustrating the front surface of the electronic device 200 according to various embodiments disclosed herein. FIG. 3 is a perspective view illustrating the rear surface of the electronic device 200 illustrated in FIG. 2.

Referring to FIGS. 2 and 3, an electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment (not illustrated), the term "housing" may refer to a structure forming some of the first surface 210A, the second surface 210B, and the side surface 210C of FIG. 2. According to an embodiment, at least a portion of the first surface 210A may be defined by a substantially transparent front plate 202 (e.g., a glass plate or a polymer plate including various coating layers). The second surface 210B may be defined by a substantially opaque rear plate 211. The rear plate 211 may be made of, for example, coated or colored glass, ceramic, polymer, metal (e.g., aluminum, stainless steel (STS), or magnesium), or a combination of two or more of these materials. The side surface 210C may be defined by a side structure (or side bezel structure) 218 coupled to the front plate 202 and the rear plate 211 and including a metal and/or a polymer. In some embodiments, the rear plate 211 and the side structure 218 may be configured integrally with each other, and may include the same material (e.g., a metal material such as aluminum).

In the illustrated embodiment, the front plate 202 may include two first areas 210D, which are bent from the first surface 210A toward the rear plate 211 and extend seamlessly, at the opposite long edges thereof. In the illustrated embodiment (see FIG. 3), the rear plate 211 may include, at the opposite long edges thereof, two second areas 210E, which are bent from the second surface 210B toward the front plate 202 and extend seamlessly. In some embodiments, the front plate 202 (or the rear plate 211) may include only one of the first areas 210D (or the second areas 210E). In another embodiment, some of the first areas 210D or the second areas 210E may not be included. In the above-described embodiments, when viewed from a side of the electronic device 200, the side structure 218 may have a first thickness (or width) in the side surface at the side, at which the first areas 210D or the second areas 210E are not included, and may have a second thickness, which is smaller than the first thickness in the side surface at the side at which the first areas 210D or the second areas 210E are included.

According to an embodiment, the electronic device 200 may include at least one of a display 201, audio modules, sensor modules, camera modules, key input devices 217, light-emitting elements 206, and connector holes. In some embodiments, at least one of the components (e.g., the key input devices 217 or the light-emitting elements 206) may be omitted from the electronic device 200, or other components may be additionally included in the electronic device 200.

The display 201 may be exposed through, for example, a considerable portion of the front plate 202. In some embodiments, at least a portion of the display 201 may be exposed through the front plate 202 defining the first surface 210A and the first areas 210D of the side surface 210C. In some embodiments, the edges of the display 201 may be configured to be substantially the same as the shape of the periphery of the front plate 202 adjacent thereto. In another embodiment, the distance between the periphery of the display 201 and the periphery of the front plate 202 may be substantially constant in order to increase the exposed area of the display 201.

In another embodiment, recesses or openings may be provided in a portion of the screen display area of the display 201, and one or more of the audio modules, the sensor modules, the camera modules, and the light-emitting elements 206, which are aligned with the recesses or the openings, may be included. In another embodiment, the rear surface of the screen display area of the display 201 may include at least one of audio modules (e.g., a call receiver hole 214), sensor modules (e.g., a first sensor module 204), camera modules (e.g., a first camera device 205), a fingerprint sensor (e.g., a fourth sensor module 216), and light-emitting elements 206. In another embodiment, the display 201 may be coupled to or disposed adjacent to a touch-sensitive circuit, a pressure sensor capable of measuring a touch intensity (pressure), and/or a digitizer configured to detect a magnetic field-type stylus pen. In some embodiments, at least some of the sensor modules (e.g., the first sensor module 204 and a third sensor module 219) and/or at least some of the key input devices 217 may be disposed in the first areas 210D and/or the second areas 210E.

The audio modules may include a microphone hole 203 and speaker holes. The microphone hole 203 may include a microphone disposed therein to acquire external sound, and in some embodiments, a plurality of microphones may be disposed therein to be able to detect the direction of sound.

The speaker holes may include an external speaker hole 207 and a call receiver hole 214. In some embodiments, the speaker holes and the microphone hole 203 may be implemented as a single hole, or a speaker (e.g., a piezo speaker) may be included without the external speaker hole 207 and the call receiver hole 214.

The sensor modules may generate electrical signals or data values corresponding to the internal operating state or the external environmental state of the electronic device 200. The sensor modules may include, for example, a first sensor module 204 (e.g., a proximity sensor), a second sensor module (e.g., a fingerprint sensor) disposed on the first surface 210A of the housing 210, a third sensor module 219 (e.g., an HRM sensor), and/or a fourth sensor module 216 (e.g., a fingerprint sensor) disposed on the second surface 210B of the housing 210. The fingerprint sensor may be disposed not only on the first surface 210A (e.g., the display 201) of the housing 210, but also on the second surface 210B. The electronic device 200 may further include the sensor module 176 of FIG. 1, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

The camera modules may include a first camera device 205 disposed on the first surface 210A of the electronic device 200, a second camera device 212 disposed on the second surface 210B thereof, and/or a flash 213. The first camera device 205 and the second camera device 212 may include one or more lenses, an image sensor, and/or an image signal processor. The flash 213 may include, for example, a light-emitting diode or a xenon lamp. In some embodiments, two or more lenses (e.g., an infrared camera lens, a wide-angle lens, and a telephoto lens) and image sensors may be disposed on one surface of the electronic device 200.

The key input devices 217 may be disposed on the side surface 210C of the housing 210. In another embodiment, the electronic device 200 may not include some or all of the above-mentioned key input devices 217, and one of the key input devices 217, which is not included in the electronic device 101, may be implemented in another form, such as a soft key, on the display 201. In some embodiments, the key input devices may include a sensor module (e.g., the fourth sensor module 216) disposed on the second surface 210B of the housing 210.

The light-emitting elements 206 may be disposed, for example, on the first surface 210A of the housing 210. The light-emitting elements 206 may provide, for example, information about the state of the electronic device 200 in an optical form. In another embodiment, the light-emitting elements 206 may provide a light source that is interlocked with, for example, the operation of the first camera device 205. The light-emitting elements 206 may include, for example, an LED, an IR LED, and a xenon lamp.

The connector holes may include a first connector hole 208, which is capable of accommodating a connector (e.g., a USB connector) for transmitting/receiving power and/or data to/from an external electronic device, and/or a second connector hole 209, which is capable of accommodating a connector (e.g., an earphone jack) for transmitting/receiving an audio signal to/from an external electronic device.

Figure 4:
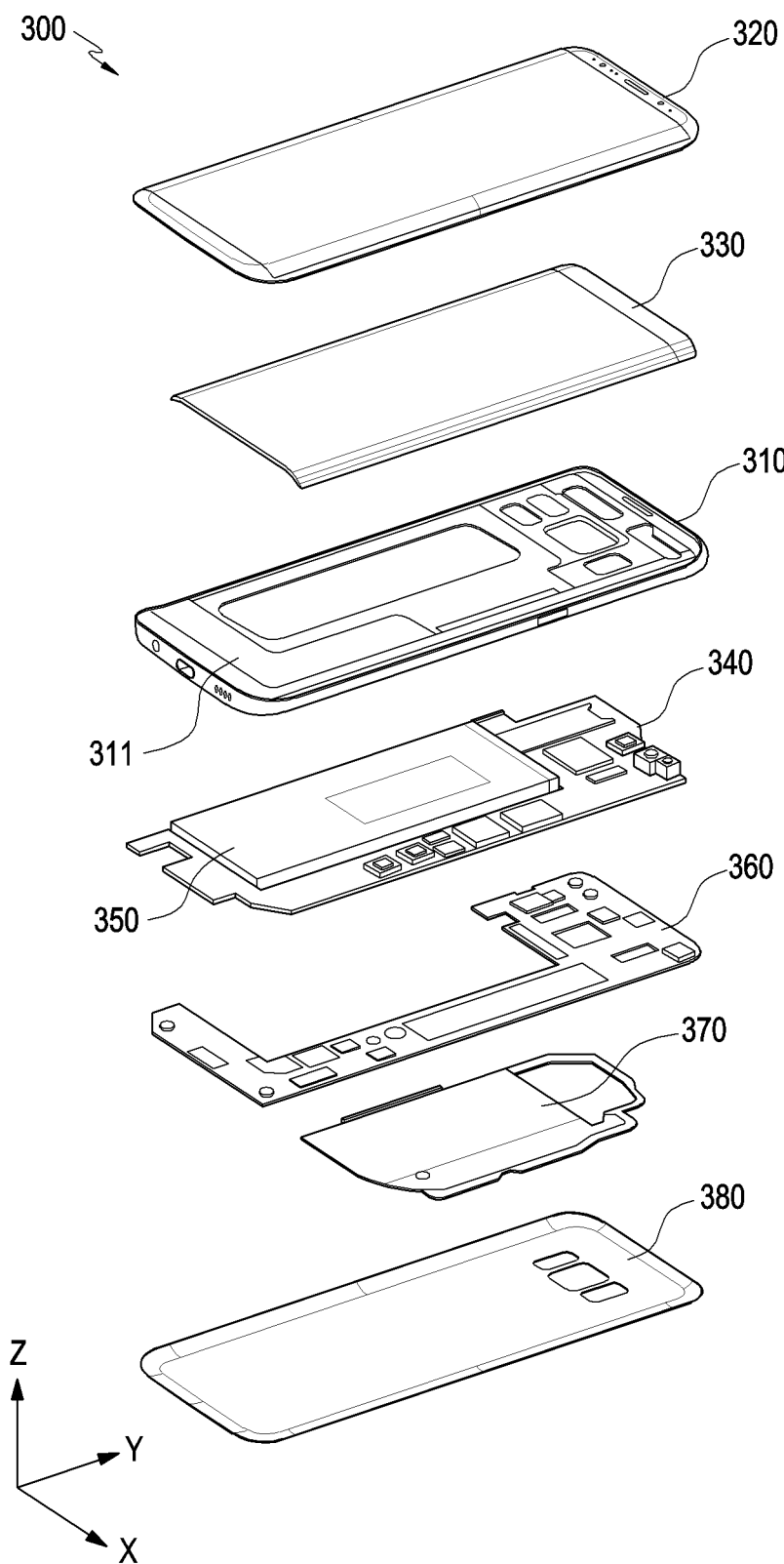
FIG. 4 is an exploded perspective view illustrating the electronic device illustrated in FIG. 2.

FIG. 4 is an exploded perspective view illustrating the electronic device 300 illustrated in FIG. 2.

Referring to FIG. 4, the electronic device 300 may include a side structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, in the electronic device 300, at least one of the components (e.g., the first support member 311 or the second support member 360) may be omitted, or other components may be additionally included. At least one of the components of the electronic device 300 may be the same as or similar to at least one of the components of the electronic device 200 of FIG. 2 or FIG. 3, and a redundant description thereof will be omitted below.

The first support member 311 may be disposed inside the electronic device 300, and may be connected to the side structure 310 or may be configured integrally with the side structure 310. The first support member 311 may be made of, for example, a metal material and/or a non-metal material (e.g., a polymer). The display 330 may be coupled to one surface of the first support member 311, and the printed circuit board 340 may be coupled to the other surface of the first support member 311. On the printed circuit board 340, a processor, a memory, and/or an interface may be mounted. The processor may include one or more of, for example, a central processing unit, an application processor, a graphics processor, an image signal processor, a sensor hub processor, and/or a communication processor.

The memory may include, for example, a volatile memory and/or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 300 to an external electronic device and may include a USB connector, an SD card/an MMC connector, and/or an audio connector.

The battery 350 is a device for supplying power to at least one component of the electronic device 300, and may include, for example, a non-rechargeable primary battery, a rechargeable secondary battery, and/or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 is capable of, for example, performing short-range communication with an external device or transmitting/receiving power required for charging to/from an external device in a wireless manner. In another embodiment, an antenna structure may be provided by a portion of the side structure 310, a portion of the first support member 311, or a combination thereof.

Figure 5:
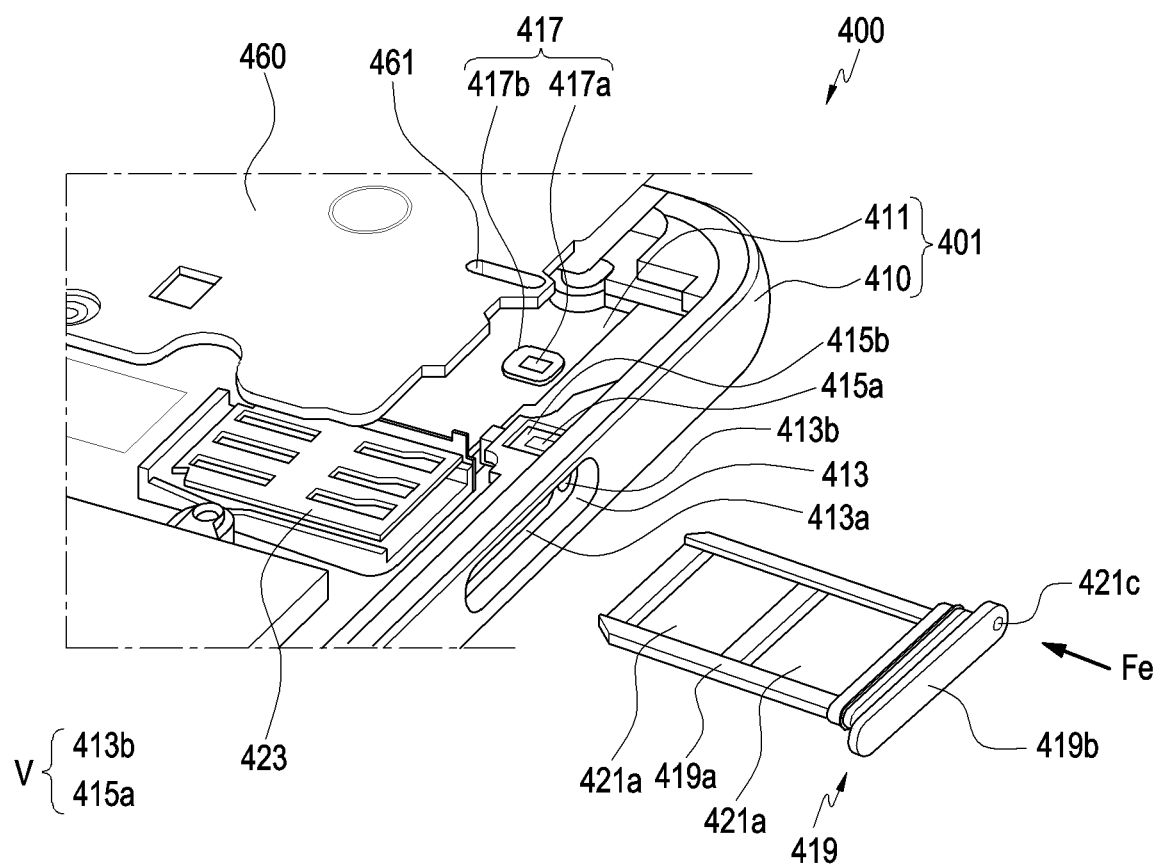
FIG. 5 is an exploded perspective view illustrating a portion of the electronic device according to various embodiments disclosed herein
Figure 6:
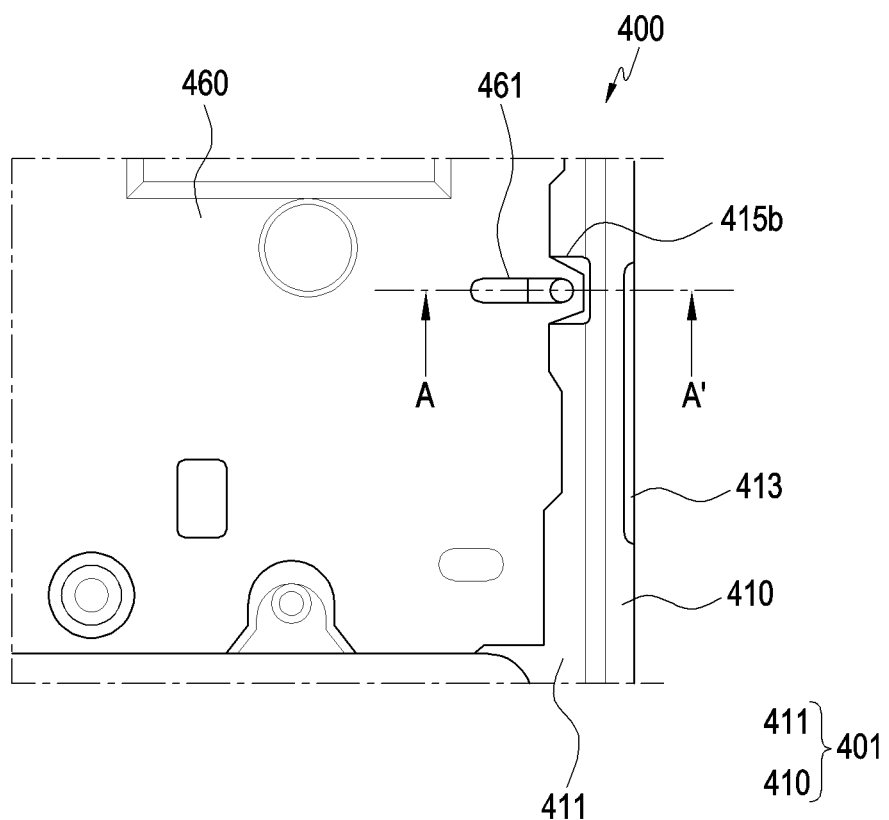
FIG. 6 is a plan view illustrating a portion of the electronic device according to various embodiments disclosed herein.
Figure 7:
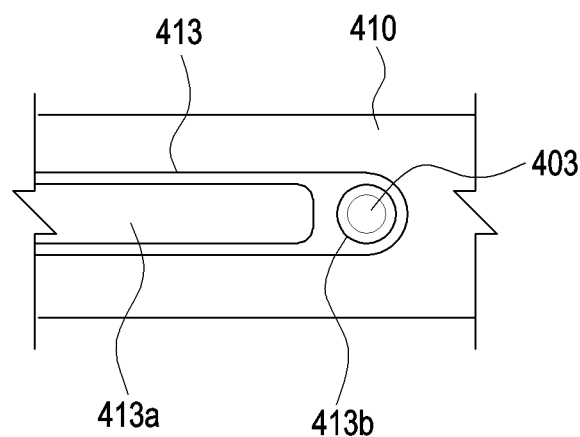
FIG. 7 is a side view illustrating a portion of the electronic device according to various embodiments disclosed herein.

FIG. 5 is an exploded perspective view illustrating an electronic device 400 (e.g., the electronic device 101, the electronic device 102, the electronic device 104, the electronic device 200, or the electronic device 300 in FIGS. 1 to 4) according to various embodiments disclosed herein. FIG. 6 is a plan view illustrating a portion of the electronic device 400 according to various embodiments disclosed herein. FIG. 7 is a side view illustrating the front side of the electronic device 400 according to various embodiments disclosed herein.

Referring to FIGS. 5 to 7, the electronic device 400 may include a housing 401 including a side structure 410 and a first support member 411 (e.g., the side structure 310 and the first support member 311 in FIG. 4), a first opening 413a and a second opening 413b, and/or a vent hole 415a. According to an embodiment, the housing 401 may include a second support member 460 (e.g., the second support member 360 in FIG. 4) coupled with the first support member 411 to face the same, and at least one circuit board (e.g., the printed circuit board 340 in FIG. 4) may be disposed between the first support member 411 and the second support member 460. As will be described later, the electronic device 400 may include an air vent hole V in which the vent hole 415a and the second opening 413b are at least partially combined, and the internal space of the housing 401 (e.g., the internal space IS in FIG. 8) may be configured to release the internal pressure by being connected to the external space through the air vent hole V. In another embodiment, an air-permeable (breathable) waterproof film 417 may be disposed on the air vent hole V (e.g., the vent hole 415a) to conceal the vent hole 415a. In some embodiments, the waterproof film 417 may block entry of moisture to the internal space IS of the housing 401 while allowing the pressure or air in the internal space of the housing 401 to be released to the outside.

According to various embodiments, the first support member 411 may be disposed between the front surface (e.g., the first surface 210A in FIG. 2) and the rear surface (e.g., the second surface 210B in FIG. 3) of the electronic device 400, and the side structure 410 may be disposed to at least partially surround the area or space in which the first support member 411 is disposed. For example, the housing 401 defines a space between the front and rear surfaces of the electronic device 400 to accommodate or protect electrical/electronic components such as a circuit board and a battery (e.g., the battery 350 in FIG. 4). In an embodiment, when viewed in a plan view, the side structure 410 may have a closed curve or polygonal frame shape, and the first support member 411 may have a flat plate shape connected to the inside of the side structure 410. Separately mentioning the side structure 410 and the first support member 411 is for convenience of description, and this separation does not limit the various embodiments disclosed herein. It shall be noted that the side structure 410 and the first support member 411 may be substantially integrally configured with each other or partially omitted. For example, as described above, the first support member 411 or the second support member 460 may be omitted, and the shape of the housing 401 may be appropriately designed according to specifications required in an electronic device to be actually manufactured.

According to various embodiments, the first opening 413a may extend from the outer surface of the side structure 410 to the internal space IS of the housing 401 through at least a portion of the side structure 410. In some embodiments, the first opening 413a may further penetrate a portion of the first support member 411 from the outer surface of the side structure 410 to be connected to the internal space IS of the housing 401. In an embodiment, the first opening 413a may be utilized as a connector hole (e.g., the first connector hole 208 and the second connector hole 209 in FIG. 2 or 3) or a sound hole for an audio module (e.g., the microphone hole 203, the external speaker hole 207, and the call receiver hole 214 in FIG. 2), and in the present embodiment, an example in which the first opening 413a is provided as a connection hole for attaching/detaching a storage medium may be disclosed. The "storage medium" may include a memory card such as an SD card (e.g., the external memory 138 in FIG. 1) or a subscriber identification module card (SIM) card.

According to various embodiments, the second opening 413b may be disposed at one side of the first opening 413a and may extend from the outer surface of the side structure 410 to the internal space of the housing 401 through at least a portion of the side structure 410. In some embodiments, the second opening 413b may further penetrate a portion of the first support member 411 from the outer surface of the side structure 410 to be connected to the internal space of the housing 401. When the first opening 413a functions as a connection hole for the storage medium, an external force Fe for separating the storage medium from the housing 401 may be provided through the second opening 413b. As will be described later, a waterproof member 403 may be disposed in the second opening 413b, and the vent hole 415a may extend from the inner wall of the second opening 413b to be exposed to the internal space IS of the housing on one surface of the first support member 411 (or the inner surface of the side structure 410). For example, the air vent hole V on the housing 401 may be provided by at least partially combining the vent hole 415a and the second opening 413b, and the vent hole 415a may be configured such that a portion of the air vent hole V bypasses the waterproof member 403. For example, the waterproof member 403 may be disposed in the second opening 413b, and the vent hole 415a may extend from the inner wall of the second opening 413b in a direction that crosses the second opening 413b to be exposed to the internal space IS of the housing 401 (or one surface of the first support member 411). Various embodiments regarding the configuration of the air vent hole V will be described in more detail with reference to FIG. 8.

According to various embodiments, the waterproof film 417 may be disposed inside the housing 401, for example, on one surface of the first support member 411 to conceal the vent hole 415a. According to an embodiment, a first attachment groove 415b may be formed on a surface of the housing 401, for example, on one surface of the first support member 411. For example, the waterproof film 417 may be attached to the first attachment groove 415b, and one end of the vent hole 415a may be located in the first attachment groove 415b. In some embodiments, the waterproof film 417 may have a waterproof performance capable of blocking the inflow of moisture while having a degree of air permeability capable of releasing the internal pressure of the housing 401 to the outside. In another embodiment, the waterproof film 417 may include an air-permeable area 417a and an attachment area 417b provided around the air-permeable area 417a. For example, the waterproof film 417 may be attached to the first support member 411 (e.g., the first attachment groove 415b) by the attachment area 417b so that the air-permeable area 417a is aligned to face the vent hole 415a whereby the internal pressure of the housing 401 can be released to the outside while the waterproof function is implemented on the vent hole 415a.

According to various embodiments, the second support member 460 (e.g., the second support member 360 of FIG. 4) may be coupled with the first support member 411 to face the same, and the electronic device 400 may further include a dummy hole 461 provided through the second support member 460. In an embodiment, in the state of being coupled with the first support member 411, the second support member 460 may bring the waterproof film 417 into close contact with the first support member 411 by supporting at least a portion of the waterproof film 417 (e.g., at least a portion of the attachment area 417b). In another embodiment, in the state in which the second support member 460 supports at least a portion of the waterproof film 417, the dummy hole 461 may be aligned with the vent hole 415a with the waterproof film 417 (e.g., at least a portion of the air-permeable area 417a) interposed therebetween. For example, the dummy hole 461 may configure the air vent hole V together with a portion of the vent hole 415a and/or the second opening 413b. In another embodiment, the dummy hole 461 may be interpreted as a portion of the internal space IS of the housing 401.

According to various embodiments, when the first opening 413a is provided as a connection hole for a storage medium, the electronic device 400 may further include a tray 419 inserted through the first opening 413a and a socket 423 aligned with the first opening 413a. The tray 419 may include a receiving portion 419a inserted into the housing 401 through the first opening 413a and at least partially accommodated in the socket 423, and a head 419b provided at one end of the receiving portion 419a. The receiving portion 419a has a frame shape providing at least one receiving groove 421a, and may receive a memory card or a subscriber identification module card using the receiving groove 421a. For example, the receiving portion 419a may be provided as a means for disposing the storage medium into the socket 423. The head 419b may define a portion of the external appearance of the electronic device 400 together with the side structure 410 while concealing the first opening 413a and/or the second opening 413b from the external appearance of the electronic device 400.

According to various embodiments, the outer surface of the side structure 410 may further include a recessed portion 413 in which the head 419b is accommodated. For example, in the state in which the tray 419 is coupled to the housing 401, the head 419b may be accommodated in the recessed portion 413, and the outer surface of the head 419b may form a continuous flat surface or a continuous curved surface with the outer surface of the side structure 410. In an embodiment, in the structure in which the recessed portion 413 is provided on the outer surface of the side structure 410, the first opening 413a and/or the second opening 413b may extend from the bottom or inner wall of the recessed portion 413 to be connected to the inside of the housing 401. For example, in the state in which the tray 419 is coupled to the housing 401, the first opening 413a and/or the second opening 413b may be substantially concealed by the head 419b. In some embodiments, in the structure in which an external force Fe that separates the storage medium or the tray 419 through the second opening 413b acts, the head 419b may further include a tray hole 421c provided to be aligned with the second opening 413b. For example, when the tray 419 is coupled to the housing 401, the tray hole 421c may be disposed to correspond to the second opening 413b.

According to various embodiments, the socket 423 may be disposed on a circuit board (e.g., the printed circuit board 340 in FIG. 3) or may be electrically connected to the circuit board via another electrical wiring (e.g., a flexible printed circuit) in the state of being disposed adjacent to the circuit board. The socket 423 may be disposed inside the housing 401 in the state of being aligned with the first opening 413a, and at least a portion of the tray 419 (e.g., the receiving portion 419a) inserted through the first opening 413a may be accommodated in the socket 423. In an embodiment, the electronic device 400 may further include a release structure (e.g., a push bar 425 in FIG. 8) disposed at one side of the socket 423. The release structure may release the tray 419 accommodated in the socket 423 to the outside of the housing 401 by using an external force Fe applied through the second opening 413b. For example, one end of the release structure may be aligned to at least partially face the second opening 413b or the waterproof member 403 of FIG. 7. The waterproof member 403 may transmit the external force Fe applied through the tray hole 421c to the release structure while providing a waterproof structure inside the second opening 413b.

In the following detailed description, reference may be made to the electronic device 101, the electronic device 102, the electronic device 104, the electronic device 200, and the electronic device 300 of the preceding embodiments, and for components that can be easily understood through the preceding embodiments the same reference numerals in the drawings may be given or reference numerals may be omitted, and a detailed description thereof may also be omitted.

Figure 8:
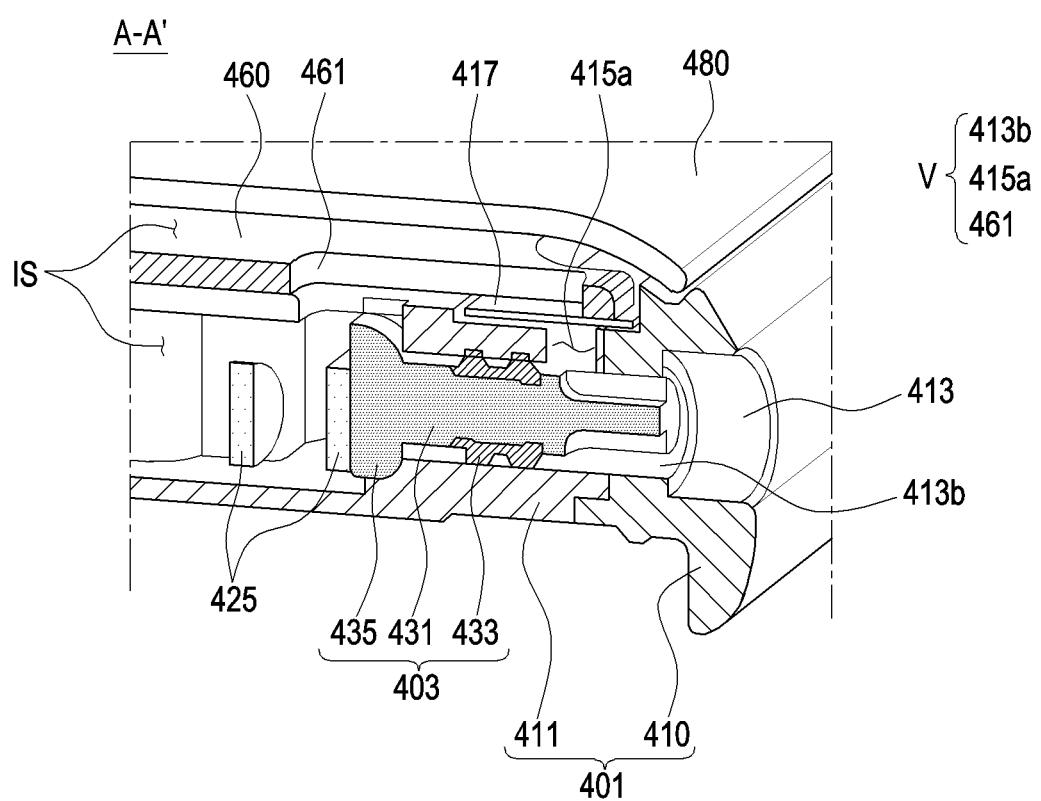
FIG. 8 is a perspective view obtained by cutting a portion of the electronic device along line A-A' in FIG. 6.

FIG. 8 is a perspective view obtained by cutting a portion of the electronic device 400 along line A-A' in FIG. 6.

Referring to FIG. 8, by combining a portion of the second opening 413b, the vent hole 415a, and/or the dummy hole 461 with each other, an air vent hole V extending from the internal space IS of the housing 401 to the external space may be provided. Here, "a portion of the second opening 413b" may refer to a portion of the second opening 413b located between the outer surface of the side structure 410 and a waterproof ring 433 to be described later. In another embodiment, "a portion of the second opening 413b" may be defined by a gap provided between the inner wall of the second opening 413b and the outer peripheral surface of the waterproof member 403 (e.g., a pin member 431 to be described later). In an embodiment, by disposing the waterproof film 417 between the dummy hole 461 and the vent hole 415a, it is possible to block the inflow of moisture while allowing the internal pressure of the housing 401 to be released to the external space. For example, even when the air vent hole V is provided to bypass the waterproof structure implemented by the waterproof member 403, a stable waterproof structure can be maintained.

According to various embodiments, the dummy hole 461 may extend by a predetermined length from a position aligned with the vent hole 415a to connect the internal space IS between the first support member 411 and the second support member 460 and/or the internal space IS between the rear plate 480 (e.g., the rear plate 380 in FIG. 4) and the second support member 460 to the vent hole 415a. For example, the dummy hole 461 may be partially closed by another structure (e.g., the first support member 411), but two spaces separated by the second support member 460 may be connected to the vent hole 415a. In the disclosed embodiment, since the waterproof film 417 is disposed between the dummy hole 461 and the vent hole 415a, "the two spaces separated by the second support member 460 being connected to the vent hole 415a" may refer to a structure that allows the internal pressure of the housing 401 to be released to the external space while blocking the inflow of moisture from the outside. In another embodiment, by bringing the waterproof film 417 into close contact with the first support member 411, the second support member 460 may prevent the waterproof film 417 from being separated from the first support member 411 by the pressure of air or moisture introduced from the outside.

According to various embodiments, the release structure disposed at one side of the socket 423, for example, the push bar 425 may be aligned with the second opening 413b, and may be actuated by an external force applied via the second opening 413b and/or the tray hole 421c. In some embodiments, an eject tool, such as a pin or stick, passes through the second opening 413b and/or the tray hole 421c to apply an external force to the push bar 425 (e.g., the external force Fe in FIG. 5). In the present embodiment, the waterproof member 403 may be disposed in the second opening 413b to configure a waterproof structure, and the waterproof member 403 may responding to the external force to actuate the release structure. "The waterproof member 403 responding to the external force" may be understood that the waterproof member 403 linearly moves within the second opening 413b by the external force Fe applied by the eject tool. In another embodiment, when the tray 419 is accommodated in the socket 423, the release structure may move the waterproof member 403 in a direction opposite to an external force (e.g., the external force Fe in FIG. 5).

According to various embodiments, the waterproof member 403 may include a pin member 431 and a waterproof ring 433, and according to an embodiment, may further include a vent recess (e.g., the vent recess 431a in FIG. 9) and/or a pin head 435. The configuration of the waterproof member 403 will be described in more detail with reference to FIGS. 9 to 11.

Figure 9:
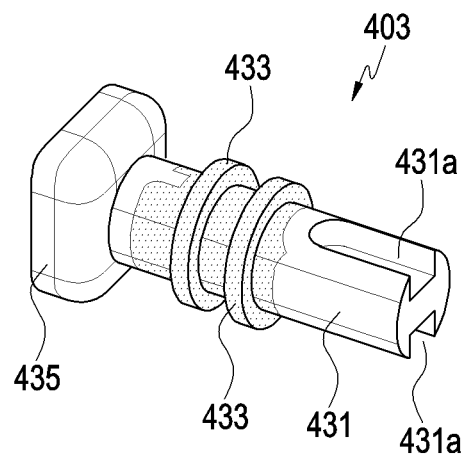
FIG. 9 is a perspective view illustrating a waterproof member of the electronic device according to various embodiments disclosed herein.
Figure 10:
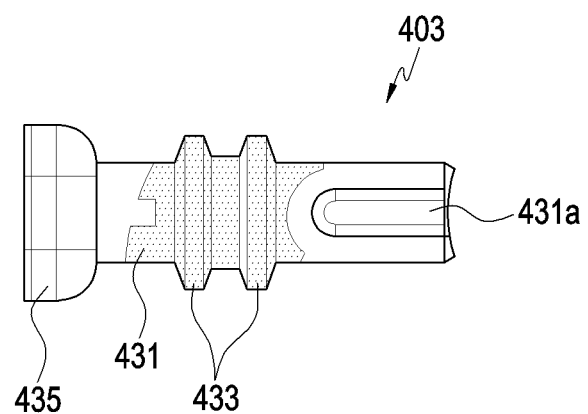
FIG. 10 is a plan view illustrating the waterproof member of the electronic device according to various embodiments disclosed herein.
Figure 11:
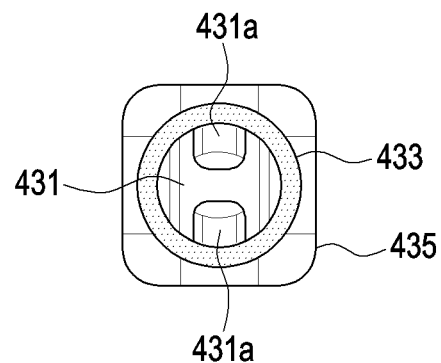
FIG. 11 is a side view illustrating the waterproof member of the electronic device according to various embodiments disclosed herein.

FIG. 9 is a perspective view illustrating the waterproof member 403 of the electronic device (e.g., the electronic device 400 in FIG. 8) according to various embodiments disclosed herein. FIG. 10 is a plan view illustrating the waterproof member 403 of the electronic device 400 according to various embodiments disclosed herein. FIG. 11 is a side view illustrating the waterproof member 403 of the electronic device 400 according to various embodiments disclosed herein.

Further referring to FIGS. 9 to 11, the pin member 431 may be disposed inside the second opening 413b and reciprocate linearly by an eject tool and/or a release structure. In an embodiment, the pin member 431 may have a smaller diameter than the second opening 413b, so that a gap having a predetermined size may be provided between the inner wall of the second opening 413b and the outer peripheral surface of the pin member 431. The gap between the inner wall of the second opening 413b and the outer peripheral surface of the pin member 431 may function as a part of the aforementioned air vent hole (e.g., the air vent hole V in FIG. 5 or FIG. 8). In another embodiment, the waterproof member 403 may further include a vent recess 431a provided on the outer peripheral surface of the pin member 431. For example, at the position at which the vent recess 431a is provided, the gap between the inner wall of the second opening 413b and the outer peripheral surface of the pin member 431 may be further increased, and the vent recess 431a may be disposed as a portion of the air vent hole V.

According to various embodiments, at least one waterproof ring 433 may protrude from the outer peripheral surface of the pin member 431 to be in close contact with the inner wall of the second opening 413b. For example, the waterproof ring 433 may be made of an elastic material and may have a larger diameter than the pin member 431 and/or the second opening 413b, so that the waterproof ring 433 may be pressed in the second opening 413b or may be close contact with the second opening 413b. According to an embodiment, the gap provided between the outer peripheral surface of the pin member 431 and the inner wall of the second opening 413b may be substantially sealed by the waterproof ring 433, whereby a waterproof structure may be provided in the second opening 413b. In some embodiments, since either end of the vent hole 415a is exposed to the inside of the second opening 413b between the waterproof ring 433 and the outer surface of the side structure 410, the air vent hole V may interconnect the internal space IS and the external space of the housing 401 via a portion of the second opening 413b.

According to various embodiments, the vent recess 431a may extend from one end of the pin member 431 to be disposed between the waterproof ring 433 and the outer surface of the side structure 410, and may be aligned to at least partially face the vent hole 415a within the second opening 413b. When the vent recess 431a is included, the waterproof member 403 may further include a pin head 435 so that the vent recess 431a may be disposed in the second opening 413b in the state of being aligned with the vent hole 415a. For example, the pin head 435 may function as an arrangement key to determine the position or alignment direction of the vent recess 431a by being engaged with the inner wall of the housing 401 or the side structure 410. The pin head 435 may have, for example, a larger diameter or shape than a diameter or shape of the pin member 431. For example, the pin head 435 may have a polygonal cylinder or polygonal column shape. In some embodiments, when the pin head 435 (e.g., a cross-sectional shape) has a rectangular column shape, a pair of the vent recess 431a may be provided on the pin member 431 at positions symmetric to each other. For example, when the waterproof member 403 is assembled in the state in which the pin head 435 is engaged with the inner wall of the housing 401 or the side structure 410, one of the pair of the vent recess 431a may be aligned with the vent hole 415a.

Figure 12:
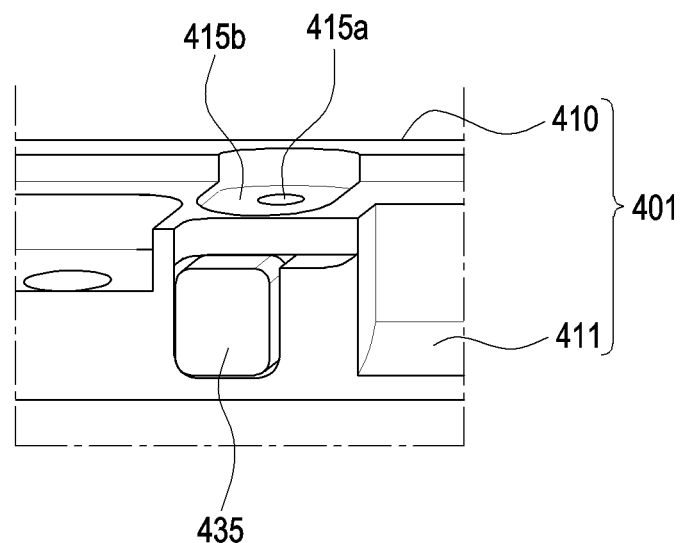
FIG. 12 is a perspective view illustrating the state in which the waterproof member of the electronic device according to various embodiments disclosed herein is disposed in the housing.
Figure 13:
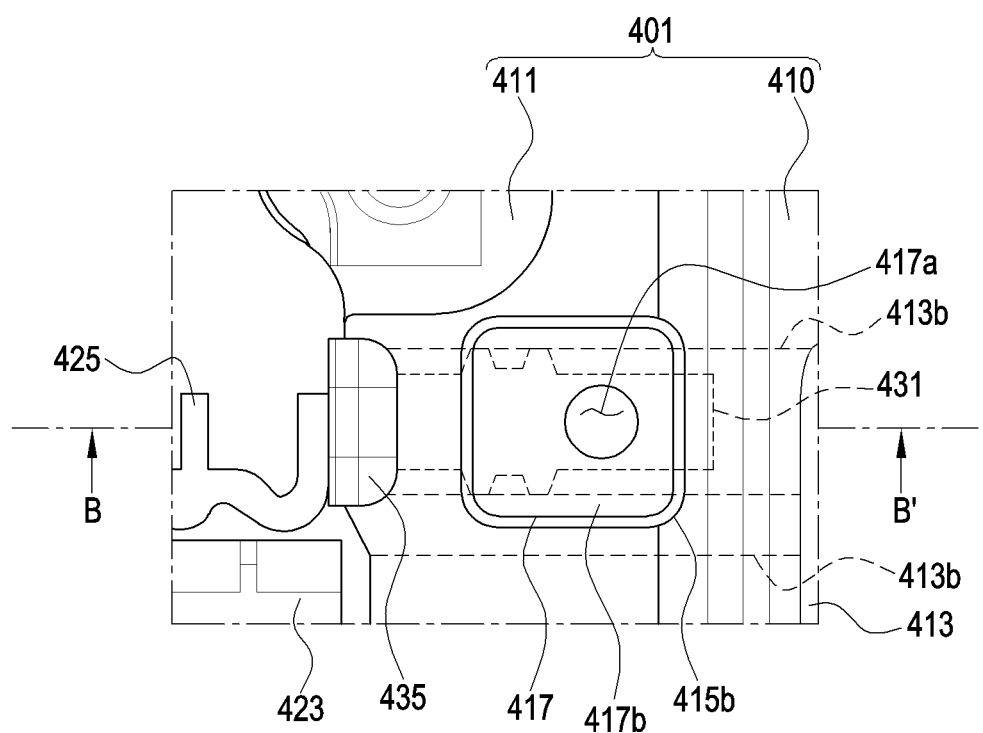
FIG. 13 is a plan view illustrating the state in which the waterproof member of the electronic device according to various embodiments disclosed herein is disposed in the housing.
Figure 14:
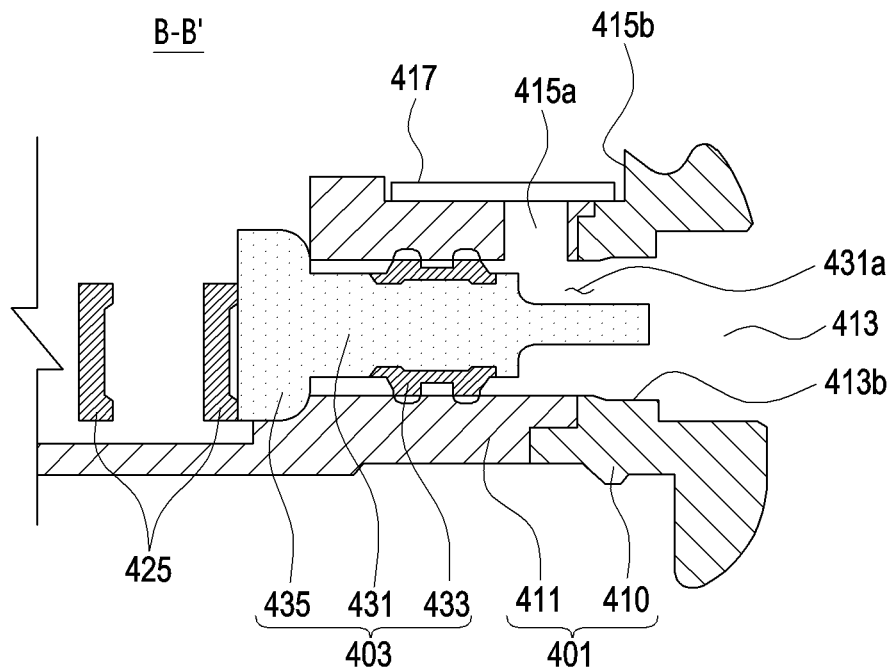
FIG. 14 is a cross-sectional view taken along line B-B' in FIG. 13, illustrating the configuration of a portion of the electronic device.

FIG. 12 is a perspective view illustrating the state in which the waterproof member (e.g., the waterproof member 403 in FIG. 8) of the electronic device (e.g., the electronic device 400 of FIG. 5 or 8) according to various embodiments disclosed herein is disposed in the housing 401. FIG. 13 is a plan view illustrating the state in which the waterproof member 403 of the electronic device 400 according to various embodiments disclosed herein is disposed in the housing 401. FIG. 14 is a cross-sectional view taken along line B-B' in FIG. 13, illustrating the configuration of a portion of the electronic device 400.

Referring to FIGS. 12 to 14, when the pin head 435, that is polygonal, is engaged with the inner wall of the housing 401 or the side structure 410, the vent recess 431a may be aligned in a predetermined position or direction. For example, the pin head 435 may be engaged with the inner wall of the housing 401 or the side structure 410 in a direction in which the vent recess 431a is aligned with the vent hole 415a. In an embodiment, the pin head 435 is positioned between the inner wall of the housing 401 or the side structure 410 and the release structure (e.g., the push bar 425), and the waterproof member 403 may respond to an external force (e.g., the external force Fe in FIG. 5) to actuate the release structure. In an embodiment, on one surface of the first support member 411, the vent hole 415a may be aligned with the air-permeable area 417a of the waterproof film 417 while being substantially concealed by the waterproof film 417. In another embodiment, the waterproof ring 433 may configure a waterproof structure in the second opening 413b by sealing the space between the inner wall of the second opening 413b and the outer peripheral surface of the pin member 431.

According to various embodiments, the vent hole 415a may be exposed between the waterproof ring 433 and the outer surface of the side structure 410 as a second opening 413b. The air vent hole V may include the vent hole 415a and at least a portion of the second opening 413b on the electronic device 400 or the housing 401. In some embodiments, in the state in which the tray (e.g., the tray 419 in FIG. 5) is coupled to the housing 401, the tray hole (e.g., the tray hole 421c in FIG. 5) may be aligned with the second opening 413b to function as another portion of the air vent hole V. According to an embodiment, the vent recess 431a may be at least partially aligned with the vent hole 415a in the second opening 413b, and may contribute to securing the distance between the inner wall of the second opening 413b and the outer peripheral surface of the pin member 431 or the cross-sectional area of the air vent hole V.

Figure 15:
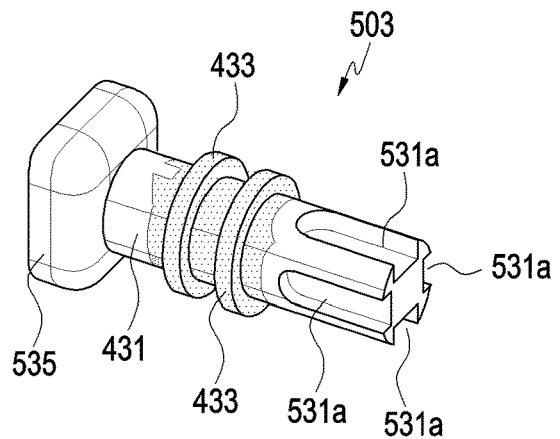
FIG. 15 is a perspective view illustrating a first modification of the waterproof member of the electronic device according to various embodiments disclosed herein.

FIG. 15 is a perspective view illustrating a first modification of a waterproof member 503 of an electronic device (e.g., the electronic device 400 in FIG. 5 or 8) according to various embodiments disclosed herein.

Referring to FIG. 15, compared with the preceding embodiments, the waterproof member 503 may include two pairs of vent recesses 531a (e.g., four vent recesses). For example, in assembling the waterproof member (e.g., the waterproof member 403 of FIG. 8 or 9) to the housing 401 in the preceding embodiments, the vent recess 431a is aligned in any one of the two designated directions, the waterproof member 503 may have a structure in which the vent recess 431a is aligned in one of two predetermined directions, and the waterproof member 503 of FIG. 15 may be aligned in one direction selected from among a greater number of (e.g., four) directions. According to an embodiment, as the number of the vent recesses 531a that can be selected in the alignment direction increases, the waterproof member 503 may be assembled more conveniently. When the waterproof member 503 includes two pairs of vent recesses 531a, the pin head 535 may have a square shape.

In the above-described embodiment, the shape (e.g., cross-sectional shape) of the pin head 453 or the pin head 535 has been described as a polygonal shape, for example, a rectangular shape or a square shape. However, this is for the sake of brevity of description, and various embodiments disclosed herein are not limited by the above-described shapes. For example, the cross-sectional shape of the pin head 435 or the pin head 535 or the pin member 431 may be a substantially polygonal or circular shape, and according to an embodiment, corner portions or vertex portions may be processed into curved surfaces having a predetermined curvature.

Figure 16:
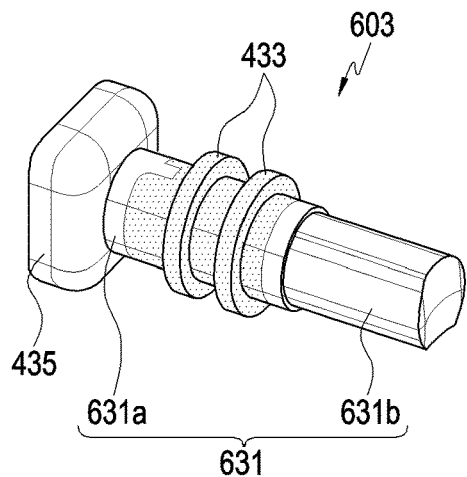
FIG. 16 is a perspective view illustrating a second modification of the waterproof member of the electronic device according to various embodiments disclosed herein.
Figure 17:
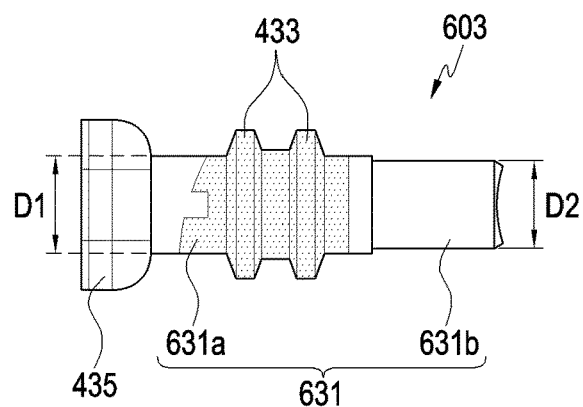
FIG. 17 is a plan view illustrating the second modification of the waterproof member of the electronic device according to various embodiments disclosed herein.

FIG. 16 is a perspective view illustrating a second modification of a waterproof member 603 of an electronic device (e.g., the electronic device 400 in FIG. 5 or 8) according to various embodiments disclosed herein. FIG. 17 is a plan view illustrating the second modification of the waterproof member 603 of the electronic device 400 according to various embodiments disclosed herein.

Referring to FIGS. 16 and 17, the waterproof member 603 may not include a vent recess (e.g., the vent recess 431a or the vent recesses 531a of FIG. 9 or 15), and in this case, a portion of the pin member 631 (e.g., a second extension 631b) may have a smaller diameter than the other portion (e.g., a first extension 631a). According to an embodiment, the pin member 631 may include a first extension 631a having a first diameter D1 and a second extension 631b extending from one end of the first extension 631a, and the second extension 631b may have a second diameter D2 smaller than the first diameter D1. The waterproof ring 433 may be disposed on the outer peripheral surface of the first extension 631a, and the second extension 631b may be disposed between the waterproof ring 433 and the outer surface of the side structure 410 within the second opening (e.g., the second opening 413b in FIG. 8). For example, within the second opening 413b, the second extension 631b may be aligned to at least partially face the vent hole 415a, and the distance between the outer peripheral surface of the second extension 631b and the inner wall of the second opening 413b may be larger than the distance between the outer peripheral surface of the first extension 631a and the inner wall of the second opening 413b. For example, since one portion of the pin member 631 has a smaller diameter than another portion, a sufficient distance to be utilized as an air vent hole (e.g., the air vent hole V in FIG. 5 or 8) can be secured inside the second opening 413b (e.g., between the outer peripheral surface of the pin member 631 and the inner wall of the second opening 413b) between the waterproof ring 433 and the outer surface of the side structure 410.

According to various embodiments, the cross-sectional shape of the second extension 631b may be a polygonal shape rather than a circular shape. For example, the second extension 631b may have a square cross-sectional shape having a diagonal length equal to or less than the first diameter D1. When the second extension 631b has a polygonal shape, a planar portion of the outer peripheral surface may be aligned to at least partially face the vent hole 415a, and a sufficient distance to be utilized as an air vent hole V can be secured between the outer peripheral surface of the second extension 631b and the inner wall of the second opening 413b.

According to various embodiments, when a portion (e.g., the second extension 631b) that is a portion of the pin member 631 and is disposed between the waterproof ring 433 and the outer surface of the side structure 410 has a circular cross-section having a diameter smaller than the first diameter D1 or a polygonal cross-section having a diagonal length less than or equal to the first diameter D1, the assembly direction of the waterproof member 603 relative to the vent hole 415a may be free. For example, no matter which direction the waterproof member 603 is assembled, a sufficient distance to be utilized as an air vent hole V can be secured between the outer peripheral surface of the second extension 631b and the inner wall of the second opening 413b, and the waterproof member 603 may be more conveniently assembled.

Figure 18:
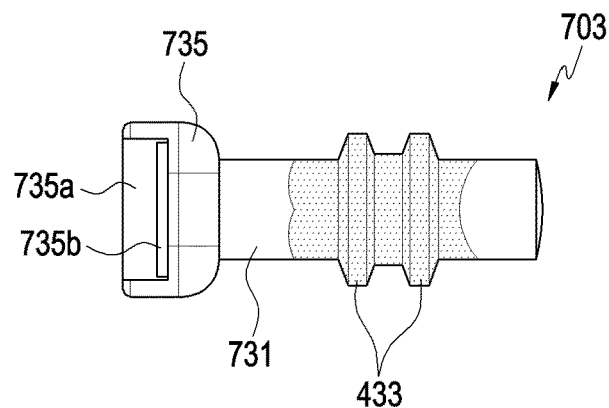
FIG. 18 is a first plan view illustrating a third modification of the waterproof member of the electronic device according to various embodiments disclosed herein.
Figure 19:
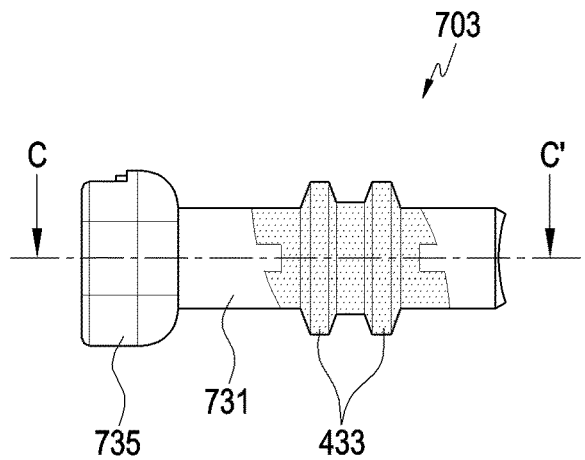
FIG. 19 is a second plan view illustrating the third modification of the waterproof member of the electronic device according to various embodiments disclosed herein.
Figure 20:
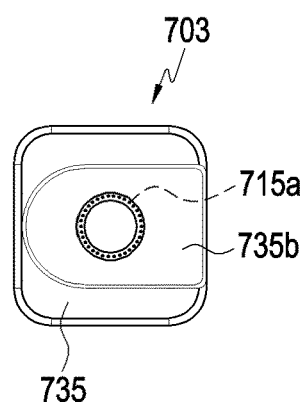
FIG. 20 is a side view illustrating the third modification of the waterproof member of the electronic device according to various embodiments disclosed herein.
Figure 21:
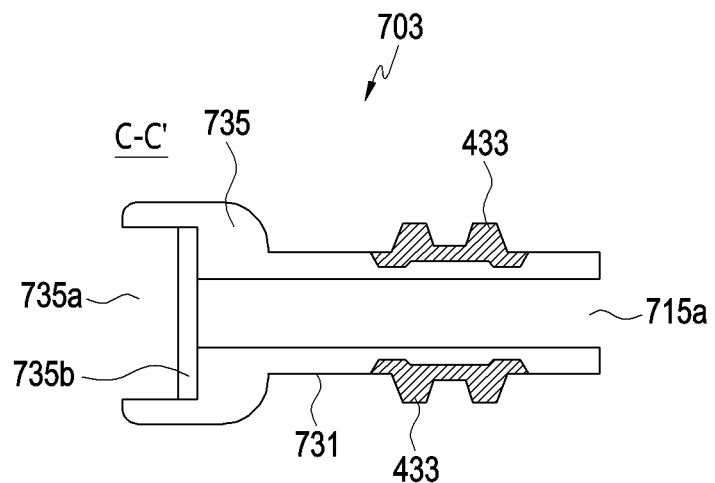
FIG. 21 is a cross-sectional view of the waterproof member taken along line C-C' in FIG. 19.

FIG. 18 is a first plan view illustrating a third modification of a waterproof member 703 of an electronic device (e.g., the electronic device 400 in FIG. 5 or 8) according to various embodiments disclosed herein. FIG. 19 is a second plan view illustrating the third modification of the waterproof member 703 of the electronic device 400 according to various embodiments disclosed herein. FIG. 20 is a side view illustrating the third modification of the waterproof member 703 of the electronic device 400 according to various embodiments disclosed herein. FIG. 21 is a cross-sectional view illustrating the waterproof member 703 taken along the line C-C' in FIG. 20.

Referring to FIGS. 18 to 21, the electronic device 400 and/or the waterproof member 703 may include a vent hole 715a provided through the pin member 731 (e.g., the pin member 431 in FIG. 8). When the vent hole 715a is disposed in the pin member 731, a vent hole (e.g., the vent hole 415a of FIG. 5 or 8) provided in the housing (e.g., the housing 401 in FIG. 5 or 8) or the first support member (e.g., the first support member 411 in FIG. 5 or 8) may be omitted. The vent hole 715a disposed in the pin member 731 may extend along a direction in which the pin member 731 linearly reciprocates within the second opening (e.g., the second opening 413b in FIG. 5 or 8), and the internal space IS of the housing 401 may be connected to the second opening 413b and/or the external space of the housing 401 through the vent hole 715a.

According to various embodiments, in implementing the waterproof structure, the waterproof member 703 may further include a waterproof film 735b disposed on the pin head 735. For example, like the waterproof film 417 of FIG. 5, the waterproof film 735*b* may include an air-permeable area (e.g., the air-permeable area 417*a* in FIG. 5) aligned with one end of the vent hole 715*a* and an attachment area (e.g., the attachment area 417*b* in FIG. 5) provided around the air-permeable area, and may be attached to the pin head 735 via the attachment area. In another embodiment, a second attachment groove 735*a* may be provided on one end surface of the pin head 735. The second attachment groove 735*a* may be recessed in the moving direction of the pin member 731 from, for example, one end face of the pin head 735, and may be exposed to the outside of the pin member 731 or the pin head 735 in a direction that crosses the direction in which the pin member 731 linearly reciprocates. According to an embodiment, one end of the vent hole 715*a* may be exposed to the bottom of the second attachment groove 735*a*, and a waterproof film (e.g., the attachment area 417*b* in FIG. 5) may be attached to the inner wall or the bottom of the second attachment groove 735*a*. Accordingly, the waterproof film 735*b* or the vent hole 715*a* may block the inflow of moisture from the outside while allowing the internal pressure of the housing 401 to be released to the outside.

Figure 22:
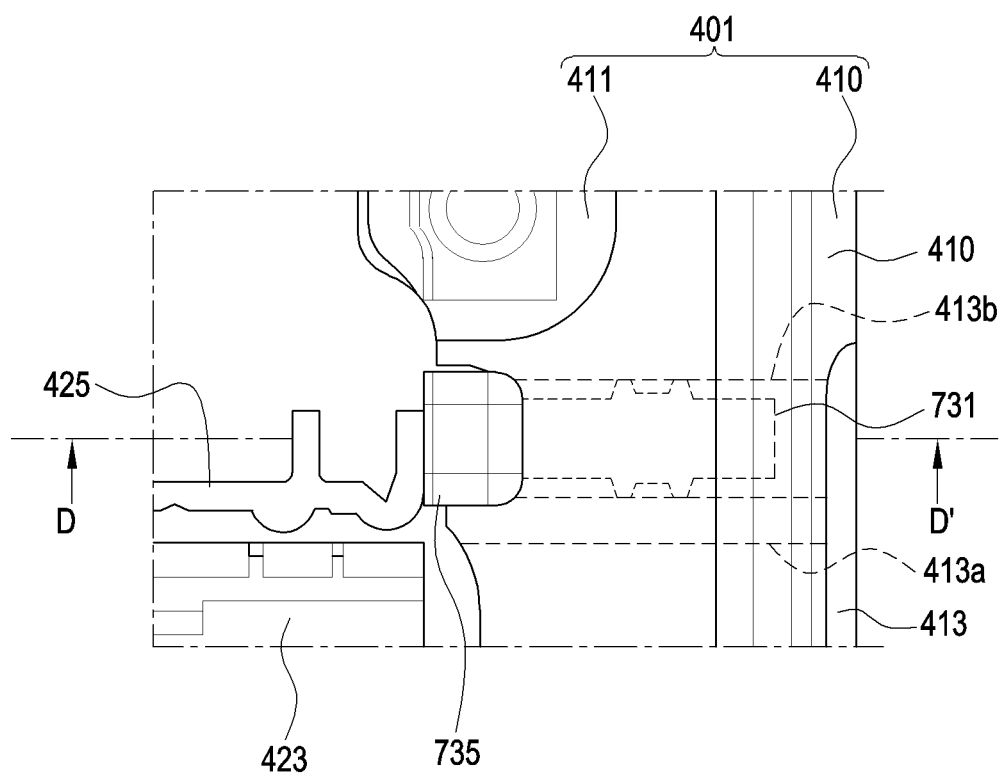
FIG. 22 is a plan view illustrating the state in which the waterproof member of the third modification is disposed in the housing in the electronic device according to various embodiments disclosed herein.
Figure 23:
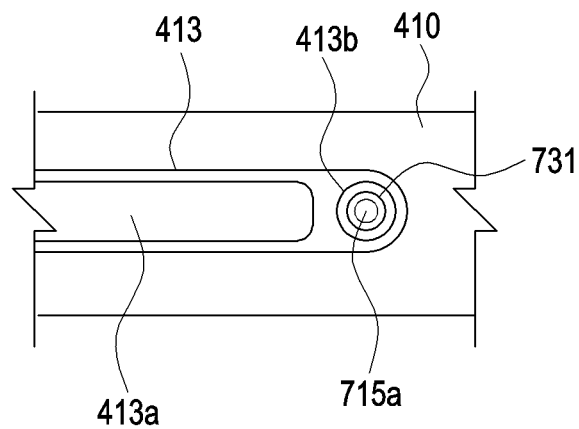
FIG. 23 is a side view illustrating the state in which the waterproof member of the third modification is disposed in the housing in the electronic device according to various embodiments disclosed herein.
Figure 24:
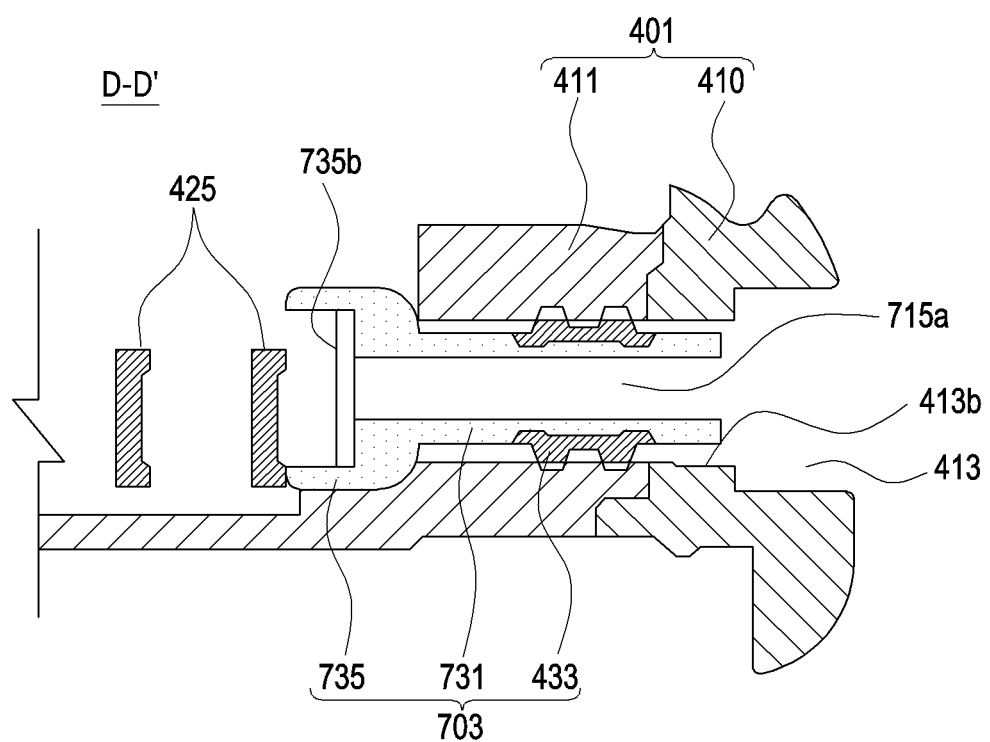
FIG. 24 is a cross-sectional view of a portion of the electronic device taken along line D-D' in FIG. 22.
Figure 25:
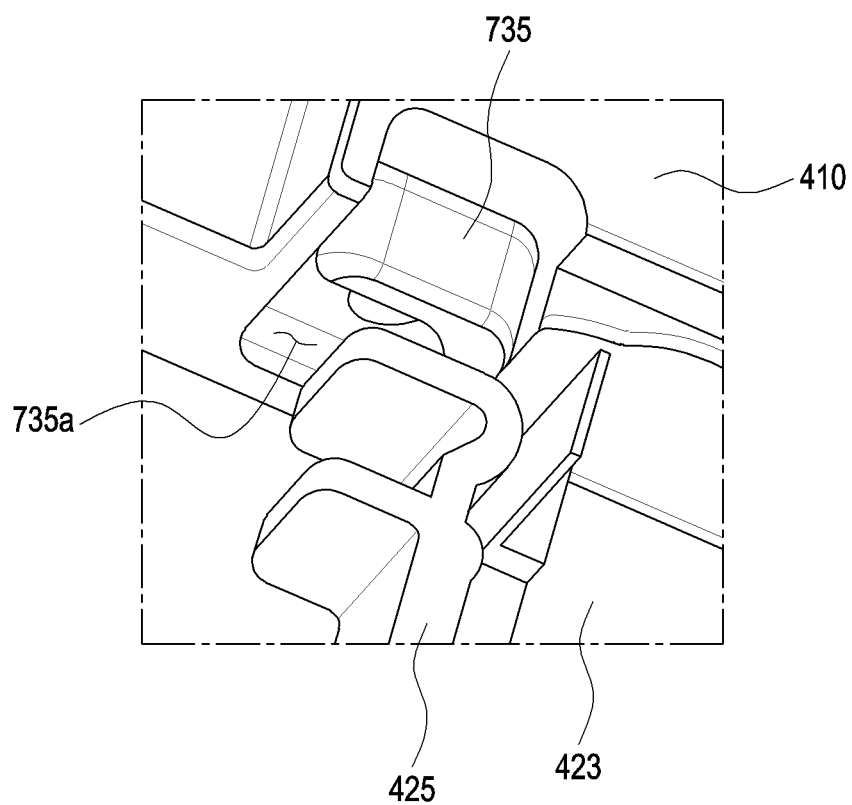
FIG. 25 is a perspective view illustrating the state in which the waterproof member of the third modification is disposed in the housing in the electronic device according to various embodiments disclosed herein.

FIG. 22 is a plan view illustrating the state in which a waterproof member (e.g., the waterproof member 703 in FIGS. 18 to 21) according to the third modification is disposed in a housing (e.g., the housing 401 in FIG. 5 or 8) in an electronic device (e.g., the electronic device 400 of FIG. 5 or 8) according to various embodiments disclosed herein. FIG. 23 is a side view illustrating the state in which the waterproof member 703 according to the third modification is disposed in the housing 401 in the electronic device 400 according to various embodiments disclosed herein. FIG. 24 is a cross-sectional view of a portion of the electronic device 400 taken along line D-D' in FIG. 22. FIG. 25 is a perspective view illustrating the state in which the waterproof member 603 according to the third modification is disposed in the housing 401 in the electronic device 400 according to various embodiments disclosed herein.

Referring to FIGS. 22 to 25, when the waterproof member 703 is coupled to the housing 401, the vent hole 715*a* may be exposed to the second opening 413*b* or the external space, and a release structure (e.g., the push bar 425) may be disposed to face the end face of the pin head 735. An external force Fe applied through the second opening 413*b* or the tray hole 421*c* of FIG. 5 may move the waterproof member 703 linearly, and the waterproof member 703 may respond to the external force to actuate the release structure.

According to various embodiments, a portion of the push bar 425 facing the pin head 735 may be smaller than the end face of the pin head 735. For example, the second attachment groove 735*a* may be at least partially exposed in the internal space of the housing 401. Accordingly, the second attachment groove 735*a*, the vent hole 715*a*, and/or the second opening 413*b* may be combined to configure a pressure relief path (e.g., the air vent hole V in FIG. 5 or 8) leading from the internal space to the external space of the housing 401, and the waterproof film 735*b* may allow the internal pressure of the housing 401 to be released. In some embodiments, in stably transmitting an external force (e.g., the external force Fe in FIG. 5) applied to the waterproof member 703 to the push bar 425, the push bar 425 may be provided to come into contact with the entire end face of the pin head 735. In this case, like the tray hole 421*c* of FIG. 5, the push bar 425 may further include a second vent hole to be aligned with the vent hole 715*a* with the waterproof film 735*b* interposed therebetween, and the pressure relief structure may be implemented further including the second vent hole.

According to various embodiments disclosed herein, an electronic device (e.g., the electronic device 101, the electronic device 102, the electronic device 104, the electronic device 200, the electronic device 300, or the electronic device 400 in FIGS. 1 to 5 and/or FIG. 8) may include an air vent hole (e.g., the air vent hole V in FIG. 5 or 8) implemented by using a structure already provided in the housing, such as a connector hole (e.g., the first connector hole 208 or the second connector hole 209 in FIG. 2 or 3), a sound hole, or a storage medium connection hole. For example, various embodiments disclosed herein may prevent deterioration of the external appearance of the electronic device in disposing an air vent hole. In an embodiment, since the air vent hole may be configured to release the internal pressure of the housing (e.g., the housing 401 in FIG. 5 or FIG. 8) to the external space, it is possible to provide a stable operating environment for a component sensitive to a pressure, such as a sound component. In another embodiment, the air-permeable waterproof film (e.g., the waterproof film 417 or the waterproof film 735*b* of FIG. 5, 8, or 21) may prevent, on the air vent hole, the internal space of the electronic device from being contaminated by moisture by blocking the inflow of moisture while allowing the internal pressure of the housing to be released.

As described above, according to various embodiments disclosed herein, an electronic device (e.g., the electronic device 101, the electronic device 102, the electronic device 104, the electronic device 200, the electronic device 300, or the electronic device 400 of FIGS. 1 to 5 and/or FIG. 8) may include a housing (e.g., housing 401 in FIG. 5 or 8) including a first support member (e.g., the first support member 311 or first support member 411 in FIG. 4, 5, or 8) disposed between the front surface (e.g., the first surface 210A in FIG. 2) and the rear surface (e.g., the second surface 210B in FIG. 3) of the electronic device, and a side structure (e.g., the side structure 310 or the side structure 410 in FIG. 4, 5 or 8) disposed to surround at least a portion of an area in which the first support member is disposed. The electronic device may further include: a first opening (e.g., the first opening 413*a* in FIG. 5 or 7) extending from an outer surface of the side structure to the internal space of the housing through at least a portion of the side structure; a second opening (e.g., the second opening 413*b* of FIG. 5, 7, or 8) disposed at one side of the first opening and extending from the outer surface of the side structure to the internal space of the housing through at least a portion of the side structure, a vent hole (e.g., the vent hole 415*a* in FIG. 5 or 8) extending from an inner wall of the second opening and having one end exposed to one surface of the first support member; and a waterproof member (e.g., the waterproof member 403, 503, or 603 in FIGS. 8 to 17) at least partially accommodated in the second opening. The waterproof member may include a pin member (e.g., the pin member 431 or the pin member 631 in FIGS. 8 to 17) configured to linearly reciprocate within the second opening, and at least one waterproof ring (e.g., the waterproof ring 433 in FIGS. 8 to 17) configured to seal a space between the outer peripheral surface of the pin member and the inner wall of the second opening. The other end of the vent hole may be exposed to the inside of the second opening between the at least one waterproof ring and the outer surface of the side structure.

According to various embodiment, the waterproof member may further include a vent recess (e.g., the vent recess 431*a* or the vent recesses 531*a* in FIG. 9 or 15) provided on the outer peripheral surface of the pin member, and the vent recess may extend from one end of the pin member and may be disposed between the at least one waterproof ring and the outer surface of the side structure, the vent recess aligned to at least partially face the vent hole.

According to various embodiments, the waterproof member further may further include a pin head (e.g., the pin head 435 or the pin head 535 in FIGS. 8 to 17) provided at one end of the pin member and configured to be at least partially engaged with an inner wall of the side structure, and at least one pair of vent recesses formed on the outer peripheral surface of the pin member and disposed symmetrically with respect to each other. The vent recesses may extend from another end of the pin member and may be disposed between the at least one waterproof ring and the outer surface of the side structure, and one of the vent recesses may be aligned to at least partially face the vent hole.

According to various embodiment, the pin head may have a polygonal cylinder or polygonal column shape.

According to various embodiment, the vent hole may extend in a direction that crosses a direction in which the second opening extends.

According to various embodiment, the electronic device described above may further include an air-permeable waterproof film (e.g., the waterproof film 417 in FIG. 5 or 8) attached to the one surface of the first support member to conceal the vent hole.

According to various embodiments, the electronic device described above may further include a second support member (e.g., the second support member 360 or the second support member 460 in FIG. 4, 5, or 8) coupled with the first support member such as to face the same, and a dummy hole (e.g., the dummy hole 461 in FIG. 5 or 8) provided through the second support member. The second support member may be configured to bring the air-permeable waterproof film into close contact with the first support member by supporting at least a portion of the air-permeable waterproof film, and the dummy hole may be aligned with the vent hole with the air-permeable waterproof film interposed therebetween.

According to various embodiment, the air-permeable waterproof film may include an air-permeable area (e.g., the air-permeable area 417a in FIG. 5) aligned to face the vent hole, and an attachment area (e.g., the attachment area 417b in FIG. 5) provided around the air-permeable area and attached to the first support member.

According to various embodiment, the pin member may include a first extension (e.g., the first extension 631a in FIG. 16 or 17) including an outer peripheral surface on which the at least one waterproof ring is disposed, the first extension having a first diameter (the first diameter D1 in FIG. 17), and a second extension (e.g., the second extension 631b in FIG. 16 or 17) extending from an end of the first extension and having a second diameter (e.g., the second diameter D2 in FIG. 17) smaller than the first diameter. The second extension may be located inside the second opening between the at least one waterproof ring and the outer surface of the side structure, and may be aligned to at least partially face the vent hole.

According to various embodiment, the electronic device described above may further include a socket (e.g., the socket 423 in FIG. 5 or 13) at least partially aligned with the first opening within the housing, and a release structure (e.g., the push bar 425 in FIG. 5 or 13) disposed at one side of the socket and aligned with the waterproof member or the second opening, wherein the waterproof member is configured to actuate the release structure in response to an external force acting through the second opening.

According to various embodiments disclosed herein, an electronic device (e.g., the electronic device 101, the electronic device 102, the electronic device 104, the electronic device 200, the electronic device 300, or the electronic device 400 of FIGS. 1 to 5 and/or FIG. 8) may include a housing (e.g., the housing 401 in FIG. 5 or 8) including a first opening (e.g., the first opening 413a in FIG. 5 or 7) extending in one direction and a second opening (e.g., the second opening 413b in FIG. 5, 7, or 8) provided in parallel with the first opening at one side of the first opening. The electronic device may further include an air vent hole (e.g., the air vent hole V in FIG. 5 or 8) configured to connect an internal space of the housing to an external space, and a waterproof member (e.g., the waterproof member 403, the waterproof member 503, the waterproof member 603, or the waterproof member 703 in FIGS. 8 to 25) at least partially accommodated in the second opening. The waterproof member may include a pin member (e.g., the pin member 431, the pin member 631, or the pin member 731 in FIGS. 8 to 25) configured to linearly reciprocate within the second opening, and at least one waterproof ring (e.g., the waterproof ring 433 in FIGS. 8 to 25) configured to seal a space between the outer peripheral surface of the pin member and the inner wall of the second opening. The air vent hole may be configured to include at least a portion of the second opening between the waterproof ring and the outer surface of the housing.

According to various embodiments, the waterproof member may further include a vent hole (e.g., the vent hole 715a in FIG. 21) provided through the pin member in a direction in which the pin member is configured to linearly reciprocate, and the air vent hole may include the vent hole.

According to various embodiment, the waterproof member further may further include a pin head (e.g., the pin head 735 in FIG. 21) provided at one end of the pin member and configured to be at least partially engaged with an inner wall of the side structure, an attachment groove (e.g., the second attachment groove 735a in FIG. 21) that is recessed in one end face of the pin head, in the direction in which the pin member linearly reciprocates, and an air-permeable waterproof film (e.g., the waterproof film 735b in FIG. 21) disposed in the attachment groove.

According to various embodiments, the air-permeable waterproof film may include an air-permeable area (e.g., the air-permeable area 417a in FIG. 5) aligned to face the vent hole, and an attachment area (e.g., the attachment area 417b in FIG. 5) provided around the air-permeable area and attached to an inner wall or bottom of the attachment groove, and one end of the vent hole may be exposed to the attachment groove and aligned with the air-permeable area.

According to various embodiments, the attachment groove may be at least partially exposed to an outside of the pin member in the direction that crosses a direction in which the pin member is configured to linearly reciprocate.

According to various embodiments, the air vent hole may further include a vent hole (e.g., the vent hole 415a in FIG. 5 or 8) extending from the inner wall of the second opening to the internal space of the housing along a direction that crosses the second opening, and one end of the vent hole may be located between the at least one waterproof ring and the outer surface of the housing on the inner wall of the second opening.

According to various embodiment, the waterproof member may further include a vent recess (e.g., the vent recess 431a or the vent recesses 531a in FIG. 9 or 15) provided on the outer peripheral surface of the pin member, and the vent recess may extend from one end of the pin member and may be disposed between the at least one waterproof ring and the outer surface of the housing, the vent recess aligned to at least partially face the vent hole.

According to various embodiment, the pin member may include a first extension (e.g., the first extension 631a in FIG. 16 or 17) including an outer peripheral surface on which the at least one waterproof ring is disposed, the first extension having a first diameter (the first diameter D1 in FIG. 17), and a second extension (e.g., the second extension 631b in FIG. 16 or 17) extending from an end of the first extension and having a second diameter (e.g., the second diameter D2 in FIG. 17) smaller than the first diameter. The second extension may be located inside the second opening between the at least one waterproof ring and the outer surface of the housing, and may be aligned to at least partially face the vent hole.

According to various embodiments, the electronic device described above may include an air-permeable waterproof film (e.g., the waterproof film 417 of FIG. 5 or 8) attached to the housing such as to conceal the other end of the vent hole.

According to various embodiments, the waterproof film may include an air-permeable area (e.g., the air-permeable area 417a in FIG. 5) aligned to face the vent hole, and an attachment area (e.g., the attachment area 417b in FIG. 5) provided around the air-permeable area and attached to the housing.

In the foregoing detailed description, specific non-limiting example embodiments have been described. However, it will be evident to a person ordinarily skilled in the art that various modifications can be made without departing from the scope of the disclosure. For example, the cross-sectional shape of the second opening, the pin member, or the waterproof ring may be circular based on the description describing a "diameter", but the various embodiments disclosed herein are not limited thereto, and the cross-sectional shape of the second opening, the pin member, or the waterproof ring may be various. In some embodiments, when the cross section of the second opening, the pin member, or the waterproof ring is polygonal, the above description about the "diameter" may be understood as describing the relative size of the cross section.

What is claimed:

1. An electronic device comprising:
a housing comprising a first support member provided between a front surface and a rear surface of the electronic device, and a side structure surrounding at least a portion of an area in which the first support member is provided,
wherein a first opening extends from an outer surface of the side structure to an internal space of the housing through a first portion of the side structure;
wherein a second opening is provided at one side of the first opening and extends from the outer surface of the side structure to the internal space of the housing through a second portion of the side structure;
wherein a vent hole extends from an inner wall of the second opening and has one end exposed to one surface of the first support member;
wherein the electronic device further comprises a waterproof member at least partially accommodated in the second opening,
wherein the waterproof member comprises:
a pin member configured to be linearly reciprocated within the second opening; and
at least one waterproof ring protruding from an outer peripheral surface of the pin member and configured to seal a space between the outer peripheral surface of the pin member and the inner wall of the second opening, and
wherein another end of the vent hole is exposed to an inside of the second opening between the at least one waterproof ring and the outer surface of the side structure.

2. The electronic device of claim 1, wherein the waterproof member further comprises a vent recess formed on the outer peripheral surface of the pin member, and
the vent recess extends from one end of the pin member and is provided between the at least one waterproof ring and the outer surface of the side structure, the vent recess being aligned to at least partially face the vent hole.

3. The electronic device of claim 1, wherein the waterproof member further comprises:
a pin head provided at one end of the pin member and configured to be at least partially engaged with an inner wall of the side structure; and
at least one pair of vent recesses provided symmetrically with respect to each other on the outer peripheral surface of the pin member,
wherein the vent recesses extend from another end of the pin member and are provided between the at least one waterproof ring and the outer surface of the side structure, and
one of the vent recesses is aligned to at least partially face the vent hole.

4. The electronic device of claim 3, wherein the pin head has a polygonal cylinder or polygonal column shape.

5. The electronic device of claim 1, wherein the vent hole extends in a direction that crosses a direction in which the second opening extends.

6. The electronic device of claim 1, further comprising:
an air-permeable waterproof film attached to the one surface of the first support member to conceal the vent hole.

7. The electronic device of claim 6, further comprising:
a second support member coupled with the first support member and facing the first support member,
wherein a dummy hole extends through the second support member, and
wherein the second support member is configured to bring the air-permeable waterproof film into close contact with the first support member by supporting at least a portion of the air-permeable waterproof film, and the dummy hole is aligned with the vent hole with the air-permeable waterproof film interposed therebetween.

8. The electronic device of claim 6, wherein the air-permeable waterproof film comprises an air-permeable area aligned to face the vent hole, and an attachment area provided around the air-permeable area and attached to the first support member.

9. The electronic device of claim 1, wherein the pin member comprises:
a first extension comprising an outer peripheral surface on which the at least one waterproof ring is disposed, the first extension having a first diameter; and
a second extension extending from an end of the first extension and having a second diameter smaller than the first diameter, and
wherein the second extension is located inside the second opening between the at least one waterproof ring and the outer surface of the side structure, and is aligned to at least partially face the vent hole.

10. The electronic device of claim 1, further comprising:
a socket at least partially aligned with the first opening within the housing; and
a release structure provided at one side of the socket and aligned with the waterproof member or the second opening,
wherein the waterproof member is configured to actuate the release structure in response to an external force acting through the second opening.

11. An electronic device comprising:
a housing having a first opening extending in one direction and a second opening provided in parallel with the first opening at one side of the first opening;
a waterproof member at least partially accommodated in the second opening,
wherein the waterproof member comprises:
a pin member configured to linearly reciprocate within the second opening; and
at least one waterproof ring protruding from an outer peripheral surface of the pin member and configured to seal a space between the outer peripheral surface of the pin member and an inner wall of the second opening, and
wherein an air vent hole connects an internal space of the housing to an external space, and the air vent hole comprises at least a portion of the second opening between the at least one waterproof ring and an outer surface of the housing.

12. The electronic device of claim 11, wherein the waterproof member further comprises a vent hole provided through the pin member along a direction in which the pin member is configured to linearly reciprocate, and
the air vent hole further includes the vent hole.

13. The electronic device of claim 12, wherein the housing further comprises a first support member provided between a front surface and a rear surface of the electronic device, and a side structure surrounding at least a portion of an area in which the first support member is provided, and the waterproof member further comprises:
a pin head provided at one end of the pin member and configured to be at least partially engaged with an inner wall of the side structure;
an attachment groove that is recessed in one end face of the pin head, in the direction in which the pin member is configured to linearly reciprocate; and
an air-permeable waterproof film provided in the attachment groove.

14. The electronic device of claim 13, wherein the air-permeable waterproof film comprises an air-permeable area aligned to face the vent hole, and an attachment area provided around the air-permeable area and attached to an inner wall or bottom of the attachment groove, and
one end of the vent hole is exposed to the attachment groove and aligned with the air-permeable area.

15. The electronic device of claim 13, wherein the attachment groove is at least partially exposed to an outside of the pin member in a direction that crosses the direction in which the pin member is configured to linearly reciprocate.

16. The electronic device of claim 11, wherein the air vent hole further comprises a vent hole extending from the inner wall of the second opening to the internal space of the housing along a direction that crosses the second opening, and
one end of the vent hole is located between the at least one waterproof ring and the outer surface of the housing on the inner wall of the second opening.

17. The electronic device of claim 16, wherein the waterproof member further comprises a vent recess provided on the outer peripheral surface of the pin member, and
the vent recess extends from one end of the pin member and is provided between the at least one waterproof ring and the outer surface of the housing, the vent recess aligned to at least partially face the vent hole.

18. The electronic device of claim 16, wherein the pin member comprises:
a first extension comprising an outer peripheral surface on which the at least one waterproof ring is provided, the first extension having a first diameter; and
a second extension extending from an end of the first extension and having a second diameter less than the first diameter, and
wherein the second extension is located inside the second opening between the at least one waterproof ring and the outer surface of the housing, and is aligned to at least partially face the vent hole.

19. The electronic device of claim 16, further comprising:
an air-permeable waterproof film attached to the housing and covering another end of the vent hole.

20. The electronic device of claim 19, wherein the air-permeable waterproof film comprises an air-permeable area aligned to face the vent hole, and an attachment area provided around the air-permeable area and attached to the housing.

* * * * *